(12) United States Patent
Carbone et al.

(10) Patent No.: US 10,028,608 B2
(45) Date of Patent: Jul. 24, 2018

(54) OVEN WITH STEAM INFUSION

(71) Applicant: SharkNinja Operating LLC, Newton, MA (US)

(72) Inventors: Philip C. Carbone, North Reading, MA (US); Kyle Scott McKenney, Somerville, PA (US); Karen Benedek, Winchester, MA (US); Brian McGee, Acton, MA (US); Eric Hyp, Aspers, PA (US); Michael Joseph Smith, Salem, MA (US); Mark Allen Nichols, Newton Highlands, MA (US); William R. Arling, Windham, NH (US); Joyce Chen Tu, Brighton, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 783 days.

(21) Appl. No.: 14/376,615

(22) PCT Filed: Feb. 1, 2013

(86) PCT No.: PCT/US2013/024292
§ 371 (c)(1),
(2) Date: Nov. 21, 2014

(87) PCT Pub. No.: WO2013/116606
PCT Pub. Date: Aug. 8, 2013

(65) Prior Publication Data
US 2015/0173551 A1 Jun. 25, 2015

Related U.S. Application Data

(60) Provisional application No. 61/594,419, filed on Feb. 3, 2012.

(51) Int. Cl.
A47J 27/04 (2006.01)
F24C 15/32 (2006.01)
(Continued)

(52) U.S. Cl.
CPC ............... A47J 27/04 (2013.01); A21B 3/04 (2013.01); F24C 15/164 (2013.01);
(Continued)

(58) Field of Classification Search
None
See application file for complete search history.

(56) References Cited

U.S. PATENT DOCUMENTS 5,680,810 A * 10/1997 Sham .................. A47J 27/16
126/20
5,819,639 A 10/1998 Spell
(Continued)

OTHER PUBLICATIONS

International Preliminary Report on Patentability for PCT/US2013/024292 dated Jun. 4, 2015.
(Continued)

Primary Examiner — Eric C Wai
(74) Attorney, Agent, or Firm — Cantor Colburn LLP

(57) ABSTRACT

An oven includes a cooking enclosure including one or more cooking heater elements, a steam source in the cooking enclosure, and a steam source heater for the steam source. A sensor is responsive to the temperature of the steam source. A fluid reservoir is exterior to the cooking enclosure and a conduit extends from the fluid reservoir to or proximate the steam source. A controller energizes the steam source heater if the temperature of the steam source is below a predetermined threshold and de-energizes the steam source heater if the temperature of the steam source is above the predetermined threshold.

20 Claims, 23 Drawing Sheets

(51) Int. Cl.
*F24C 15/16* (2006.01)
*A21B 3/04* (2006.01)
*G05B 15/02* (2006.01)
*G06F 19/00* (2018.01)
*A21B 1/00* (2006.01)
*A21B 1/22* (2006.01)

(52) U.S. Cl.
CPC ............ *F24C 15/327* (2013.01); *G05B 15/02* (2013.01); *A47J 2027/043* (2013.01)

(56) References Cited

U.S. PATENT DOCUMENTS

| | | | |
|---|---|---|---|
| 6,100,502 | A | 8/2000 | Sham et al. |
| 6,170,390 | B1 | 1/2001 | Backus et al. |
| 7,537,004 | B2 | 5/2009 | Reay |
| 8,233,690 | B2 | 7/2012 | Ng et al. |
| 2006/0249136 | A1 | 11/2006 | Reay et al. |
| 2007/0102418 | A1 | 5/2007 | Swank et al. |
| 2008/0017629 | A1* | 1/2008 | Xu ........................ F24C 15/327 219/401 |
| 2008/0292761 | A1 | 11/2008 | Baratin et al. |
| 2009/0250452 | A1* | 10/2009 | Tse ........................ F24C 15/327 219/401 |

OTHER PUBLICATIONS

CN Notification of Grant with translation; CN Application No. 201390000384.6; dated May 5, 2016; pp. 1-4.
CN Office Action with translation; Application No. 201390000384.6; dated Jan. 27, 2016, pp. 1-3.
CN Office Action with translation; Application No. 201390000384.6; dated Jul. 7, 2015, pp. 1-3.
CN Second Office Action with translation; Application No. 201390000384.6; dated Oct. 16, 2015, pp. 1-2.
IPRP; International Application No. PCT/US2013/024292; International Filing Date: Feb. 1, 2013, dated May 26, 2015, pp. 1-6.
PCT Notification of Transmittal of the International Search Report and the Written Opinion, International Application No. PCT/US 13/24292; International Filing Date: Feb. 1, 2013, dated Apr. 9, 2013, pp. 1-9.

* cited by examiner

| | Cook Time Without Steam/Convection (min) | Cook Time With Steam/Convection (min) | Time Reduction |
|---|---|---|---|
| Frozen Lasagna | 80 | 41 | 49% |
| Frozen Pizza | 15.5 | 11.5 | 26% |
| Yellow Cake | 31 | 20 | 35% |
| Sugar Cookies | 18.5 | 8.75 | 53% |
| Haddock | 14.5 | 12.3 | 15% |
| Chicken Breast (Bone In) | 78 | 52.5 | 33% |

|  | Cook Time Without Steam Addition (min) | Cook Time With Steam Addition (min) | Time Reduction |
|---|---|---|---|
| Frozen Lasagna | 90 | 80 | 11% |
| Chicken Breast (Boneless) | 30 | 25 | 17% |
| Pork Chop | 30 | 24 | 20% |
| Game Hen | 60 | 50 | 17% |
| Sugar Cookies | 15 | 12 | 20% |

*FIG. 24*

|  | Weight Loss Without Steam (g) | Weight Loss With Steam (g) | Weight Loss Reduction |
|---|---|---|---|
| Fish | 38 | 28 | 26% |
| Boneless Pork Chops | 73 | 33 | 55% |
| Chicken Breast (Boneless) | 51 | 28 | 45% |
| Frozen Lasagna | 38 | 7 | 81% |
| Baked Potato | 55 | 42 | 24% |
| Vegetables | 184 | 115 | 38% |

*FIG. 25*

OVEN WITH STEAM INFUSION

RELATED APPLICATIONS

This application is a national stage application of the PCT International Application No. PCT/US2013/024292 filed Feb. 1, 2013, which claims priority to U.S. Provisional Application Ser. No. 61/594,419 filed Feb. 3, 2012, all of which are incorporated herein by this reference.

FIELD OF THE INVENTION

The inventions relate primarily to countertop ovens with steam and/or rotisserie features.

BACKGROUND OF THE INVENTION

Countertop ovens may include means for generating steam. See, for example, U.S. Pat. No. 6,100,502, incorporated herein by this reference. Usually, steam is generated exterior to the oven cooking cavity and piped into the oven cavity.

In other examples, water is piped into the oven cavity to or proximate the oven heating element therein in order to produce steam. See, for example, U.S. Pat. Nos. 5,680,810 and 8,233,690, incorporated herein by this reference.

Many prior art systems are unduly complex and expensive. Moreover, water dripping onto or near the oven heating element can cause corrosion and/or cause the oven heating element to cool.

Some countertop ovens include rotisserie features. See, for example, U.S. Pat. No. 6,170,390, incorporated herein by this reference. According to the '390 patent, two large spit plates are loaded into tracks in the oven side walls. In loading and unloading the spit assembly, the food may have to be handled. Moreover, a spit support plate is required to support the food vertically. And, drippings can fall onto the oven cavity floor making cleaning difficult.

U.S. Pat. No. 5,819,639, incorporated herein by this reference, discloses a rotisserie base, a spit support, and a manually wound spit rotation apparatus designed for use in a conventional home oven.

SUMMARY OF THE INVENTION

In one example, a countertop oven includes a steam mode wherein a steam source in the oven is automatically heated separately from the oven heating element or elements. In one state, a steam source heater is turned on and, in another state, the oven cavity heat is used to create steam wherein the steam source heater is turned off (or turned on low).

In another example, a rotisserie oven feature includes a spit assembly support fixture with a drip pan. One model oven includes both a steam source and rotisserie features.

Featured is an oven comprising a cooking enclosure including one or more cooking heater elements, a steam source in the cooking enclosure, a steam source heater for the steam source, a sensor responsive to the temperature of the steam source, a fluid reservoir exterior to the cooking enclosure, and a conduit from the fluid reservoir to or proximate the steam source. A controller controls the steam source heater independent of the cooking heater element(s). In this way, the controller can be configured to energize the steam source heater if the temperature of the steam source is below a predetermined threshold and to de-energize the steam source heater if the temperature of the steam source is above the predetermined threshold.

Further included may be means for controlling fluid flow from the fluid reservoir to the steam source to produce steam at a predetermined rate such as one or more valves and/or a pump. 6-7 grams of steam per minute is preferred. Preferably, the controller is further configured to control the fluid flow control means. The steam source may include a small trough and the steam source heater is preferably adjacent to or within the small trough. In one example, the conduit terminates above the small trough which may be positioned proximate a bottom corner of the cooking enclosure. A cover may be provided for the trough. In one version, the fluid reservoir is removably coupled to an exterior of the cooking enclosure.

Preferably, the controller is configured to output a signal if the temperature of the steam source is greater than a second predetermined threshold. When the temperature of the steam source is above the second predetermined threshold, the steam source heater is energized, the fluid control means is controlled, and the temperature of the steam source is measured. The steam source heater is de-energized if the measured temperature does not fall below the second predetermined threshold.

Also featured is a control method for steam infusion in an oven. One method comprises sensing the temperature of a steam source within the oven, supplying fluid from a fluid reservoir to the steam source in a steam infusion mode, energizing a steam source heater if the temperature of the steam source is below a predetermined threshold, and de-energizing the steam source heater if the temperature of the steam source is above the predetermined threshold. The method may further include providing a signal if the temperature of the steam source is above a second predetermined threshold. The method may further include controlling the fluid supplied to the steam source to produce steam (e.g., at a rate of between approximately 6-7 grams per minute.) The method may further include, when the temperature of the steam source is above a second predetermined threshold, the steps of supplying fluid to the steam source, energizing the steam source heater, sensing the temperature of the steam source, and de-energizing the steam source heater if the measured temperature does not fall below the second predetermined threshold.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 22 is a schematic view of the air flow system of FIG. 16;

FIGS. 23-25 are tabulated results of the improvements in cooking time and moisture retention with the cooking system according to some embodiments of the present disclosure.

DETAILED DESCRIPTION OF THE INVENTION

Figure 1:
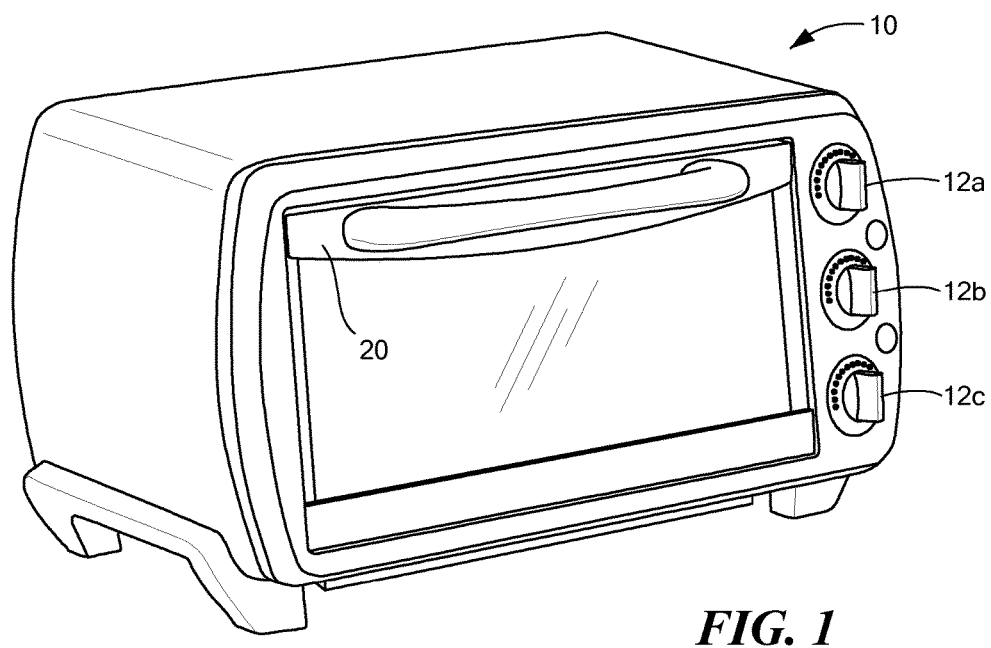
FIG. 1 is a schematic three dimensional front view of an example of a countertop oven in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts countertop oven 10 with controls 12a, 12b, and 12c, e.g., temperature controls, a timer, and mode settings (e.g., rotisserie, steam infusion, toasting, broiling, baking, convection) and the like.

Figure 2:
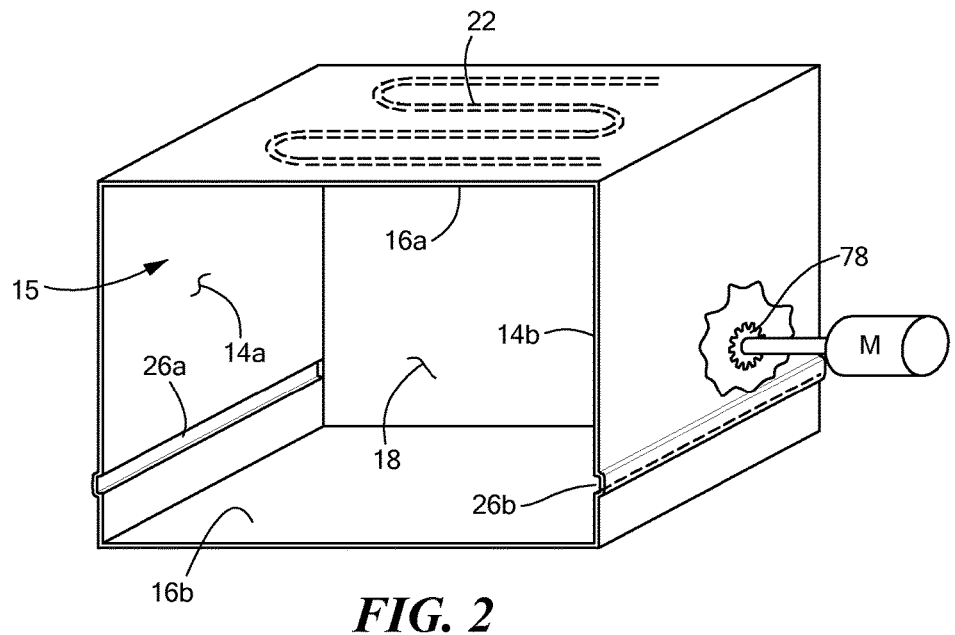
FIG. 2 is a schematic three dimensional view showing the cooking enclosure of the countertop oven shown in FIG. 1.

The cooking enclosure 15, FIG. 2, includes spaced interior side walls 14a, 14b, bottom and top surfaces 16a, 16b, rear wall 18 and front door 20, FIG. 1 with a glass window.

One or more racks are typically provided as shown FIG. 1 removeably retained in the cooking enclosure at different heights via side tracks. There may be a top heating element as show at 22 in FIG. 2 within the enclosure secured to top surface 16a. A bottom heating element, one or more side heating elements, a rear wall heating element, and the like are possible adjacent to or within the oven walls.

In a rotisserie model, lower side tracks 26a and 27b are preferably associated with side walls 14a and 14b and added near the bottom of the cooking enclosure. The tracks can be grooves in the side walls or indents formed in a structure added to the side walls. The tracks may be continuous or include discrete support members.

Figure 3:
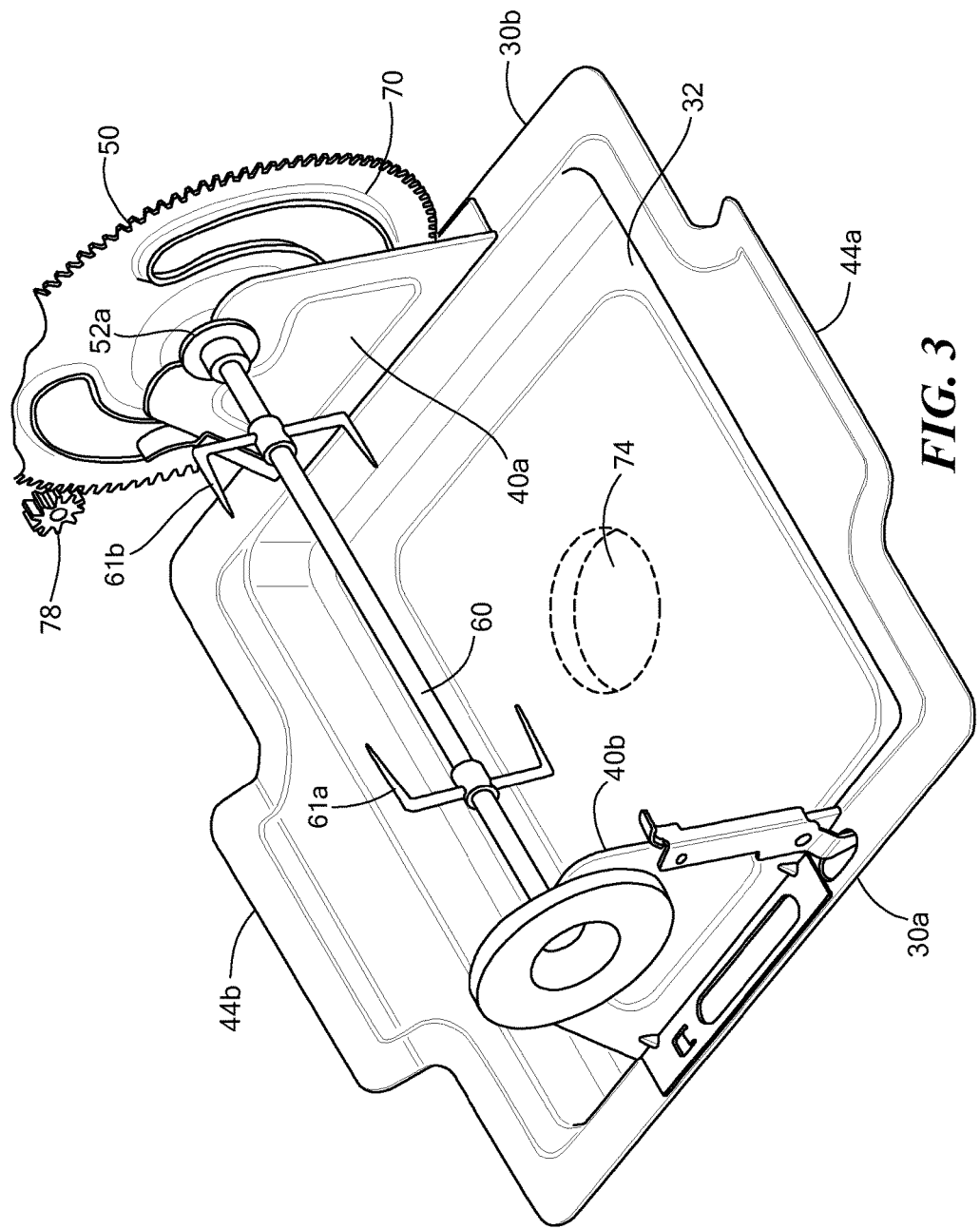
FIG. 3 is a schematic view showing a spit assembly support framework supporting a spit assembly for use with the countertop oven of FIGS. 1 and 2.
Figure 4:
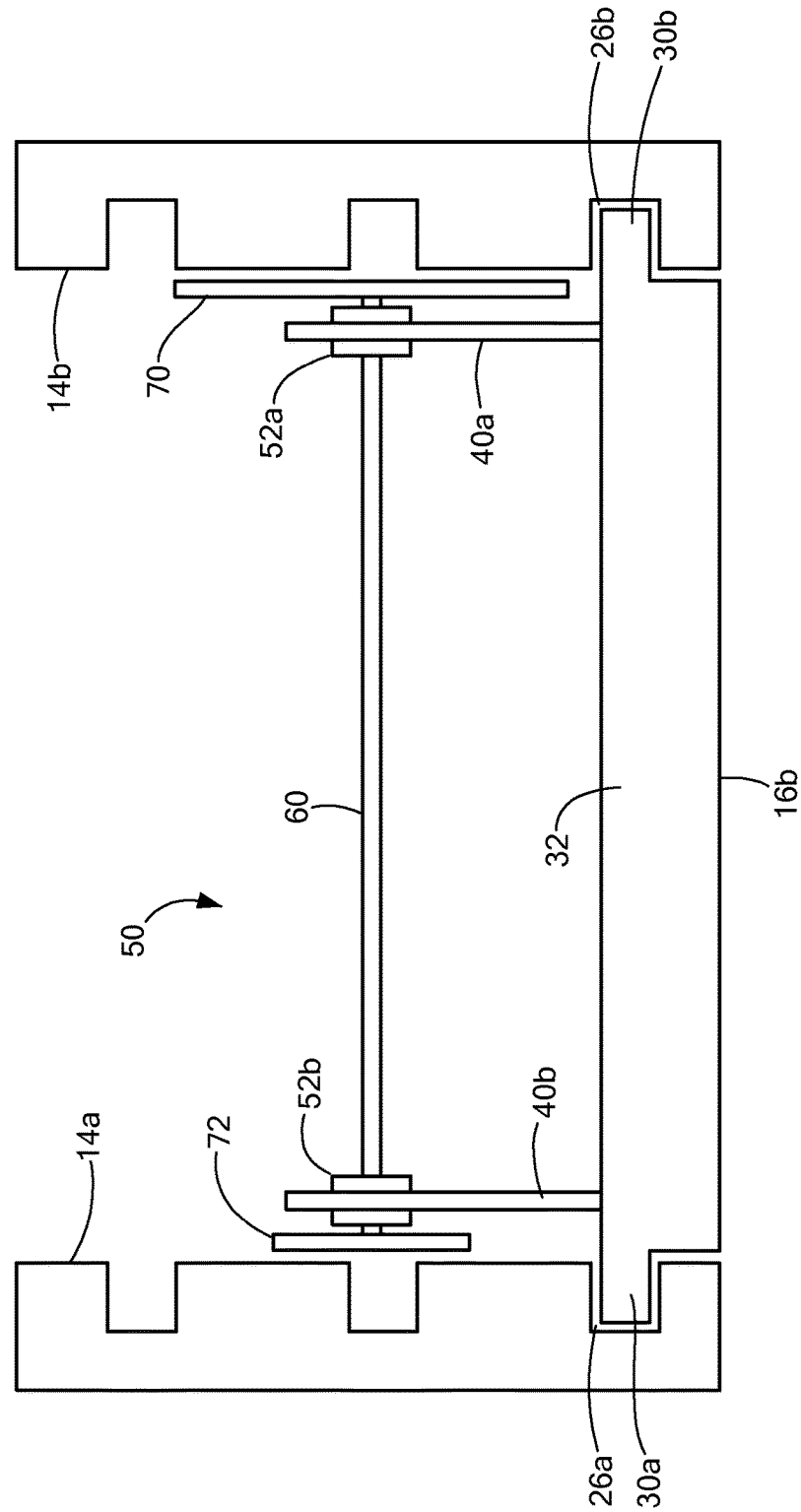
FIG. 4 is a schematic front view showing the spit assembly framework and a spit assembly disposed with the oven cavity of FIGS. 1 and 2.

The side tracks preferably receive the side rails 30a, 30b of drip pan 32, FIGS. 3-4. The drip pan may sit on the bottom of the cooking enclosure or may be elevated slightly off the bottom by virtue of the pan side rails being supported by oven enclosure lower side tracks. A drip pan front portion 44a and a rear portion 44b preferably engage the front and rear of the cooking enclosure respectively, e.g., rear wall 18, FIG. 2 and front door 20, FIG. 1.

The drip pan 32, FIGS. 3-4, is preferably a component of a spit assembly support framework also including side racks 40a and 40b each including a spit assembly support (e.g., a top U-shaped channel as show at 42a formed in side rack 40a). The bushings of spit assembly 50 are supported (rotatably supported or otherwise) in these U-shaped channels as shown for spool shaped or grooved bushing 52a supported in the top support 42a of side rack 40a. Spool shaped bushing 52b, FIG. 4 is supported in the top support of side rack 40b. The side racks may be pivotably attached to the drip pan and/or removably attached to drip pan. Preferably, the side racks pivot inward and fold over each other adjacent the bottom floor of the drip pan.

As shown in FIG. 4 spit rod 60 extends between the center of each bushing 52a, 52b. Adjustable forks 61a and 61b, FIG. 3, may be provided each with two or more spits. Gear wheel 70 may be attached to bushing 52a, FIG. 4, and handle member 72 may be attached to bushing 52b. In such a design, the smaller diameter handle member 72 is preferably configured to support the spit assembly vertically on a countertop or on the drip pan for loading the spit assembly with food and/or for seasoning the same and/or during removal/disassembly operations. In one embodiment, drip pan 32 may include a recess or cavity as shown at 74, FIG. 3 for receiving round handle 72 and/or gear wheel 70 therein.

The cooking enclosure in this embodiment preferably includes motor (M) driven gear 78, FIGS. 2-3 proximate side wall 14b in order to drive (rotate) gear wheel 70, FIG. 3. In other designs, the spit assembly spit rod 60 extends through bushing 42 and into a socket associated with an exterior mounted barbeque type rotisserie motor. Bushings 52a and 52b may rotate with spit rod 60 or may be stationary with respect to spit rod 60 which then rotates with respect to the bushings.

Figure 5A:
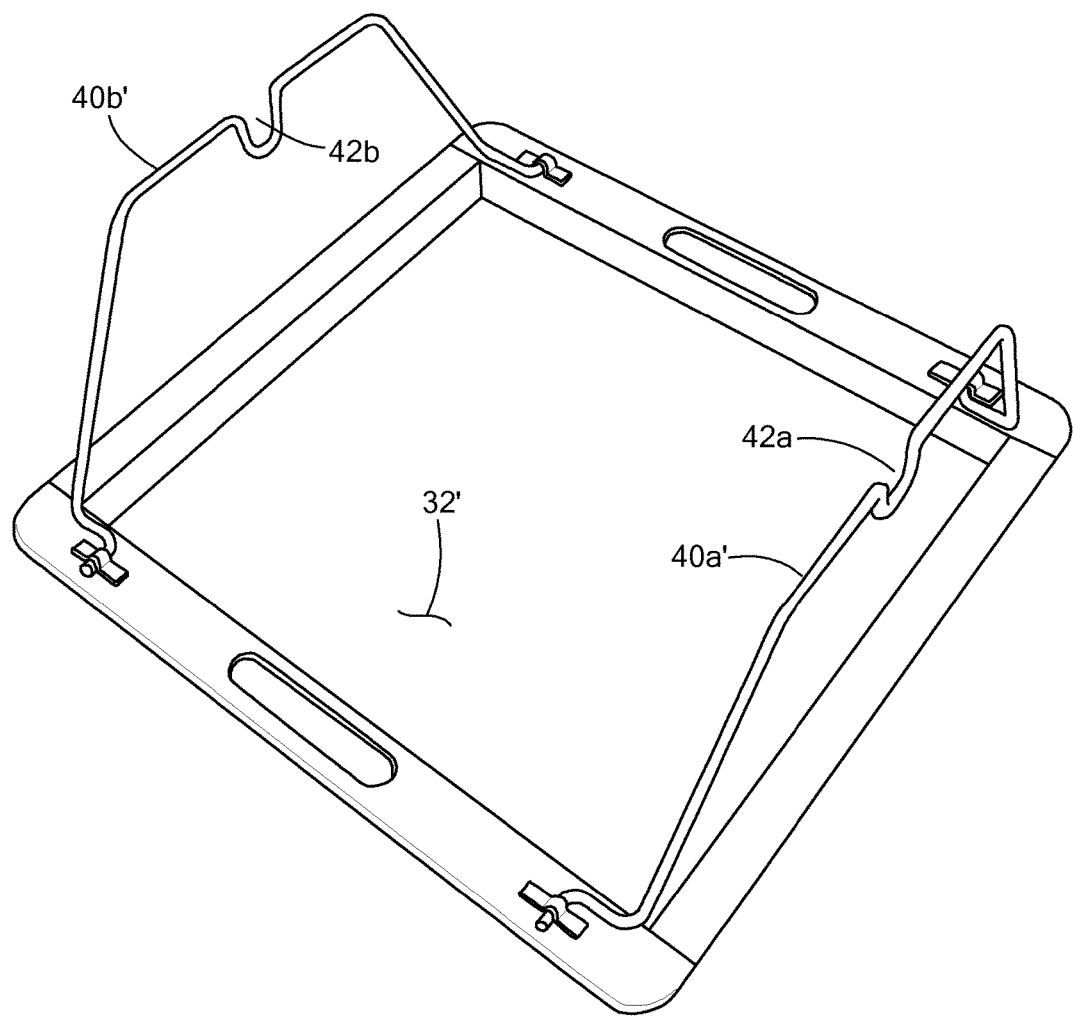
FIG. 5A is a schematic three dimensional top view of another embodiment of a spit assembly support framework.
Figure 5B:
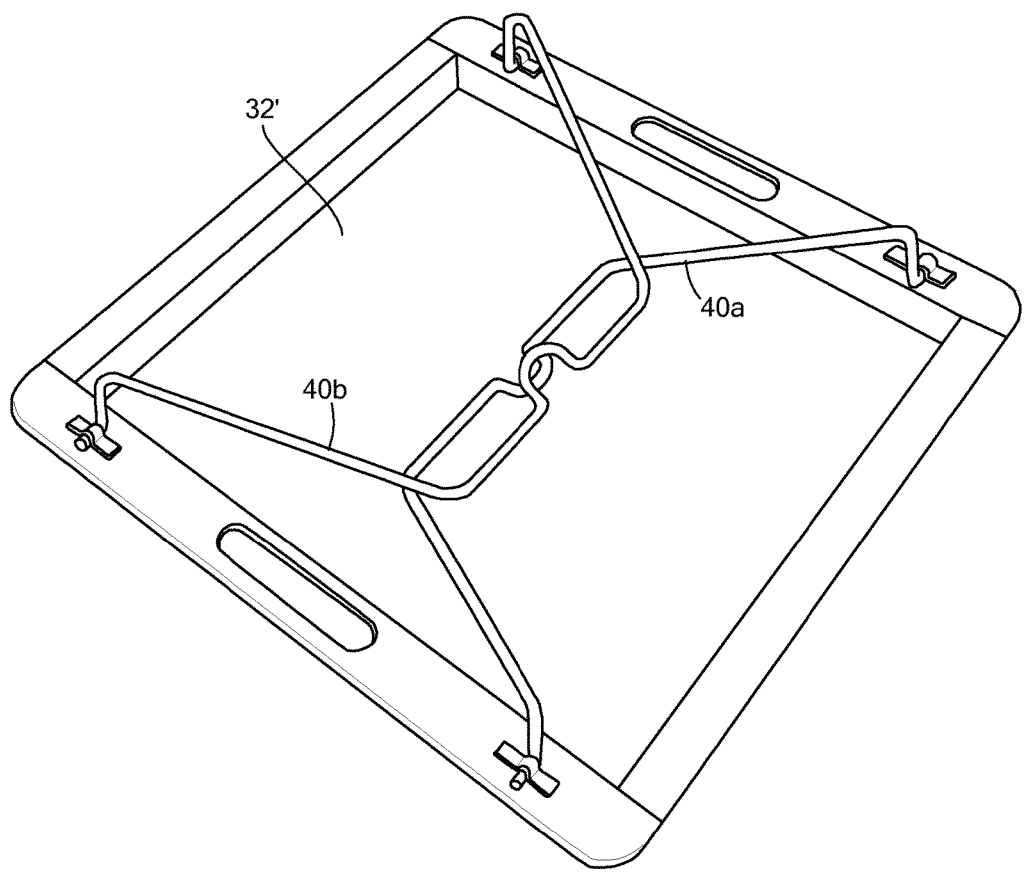
FIG. 5B is a schematic three dimensional top view showing the spit assembly support framework of FIG. 5A with the side racks folded down.

FIG. 5A shows an embodiment where side racks 40a' and 40b' are wire members pivotably and removably attached to pan 32'. The bushing supports 42a and 42b are U-shaped downward bends in the wire which also extends upwardly and inwardly at an angle from the front corner and rear corner of pan 32'. In this way, the side racks are configured to fold down one over the other into the interior of the drip pan. FIG. 5B show the wire side racks folded inwardly.

Figure 6:
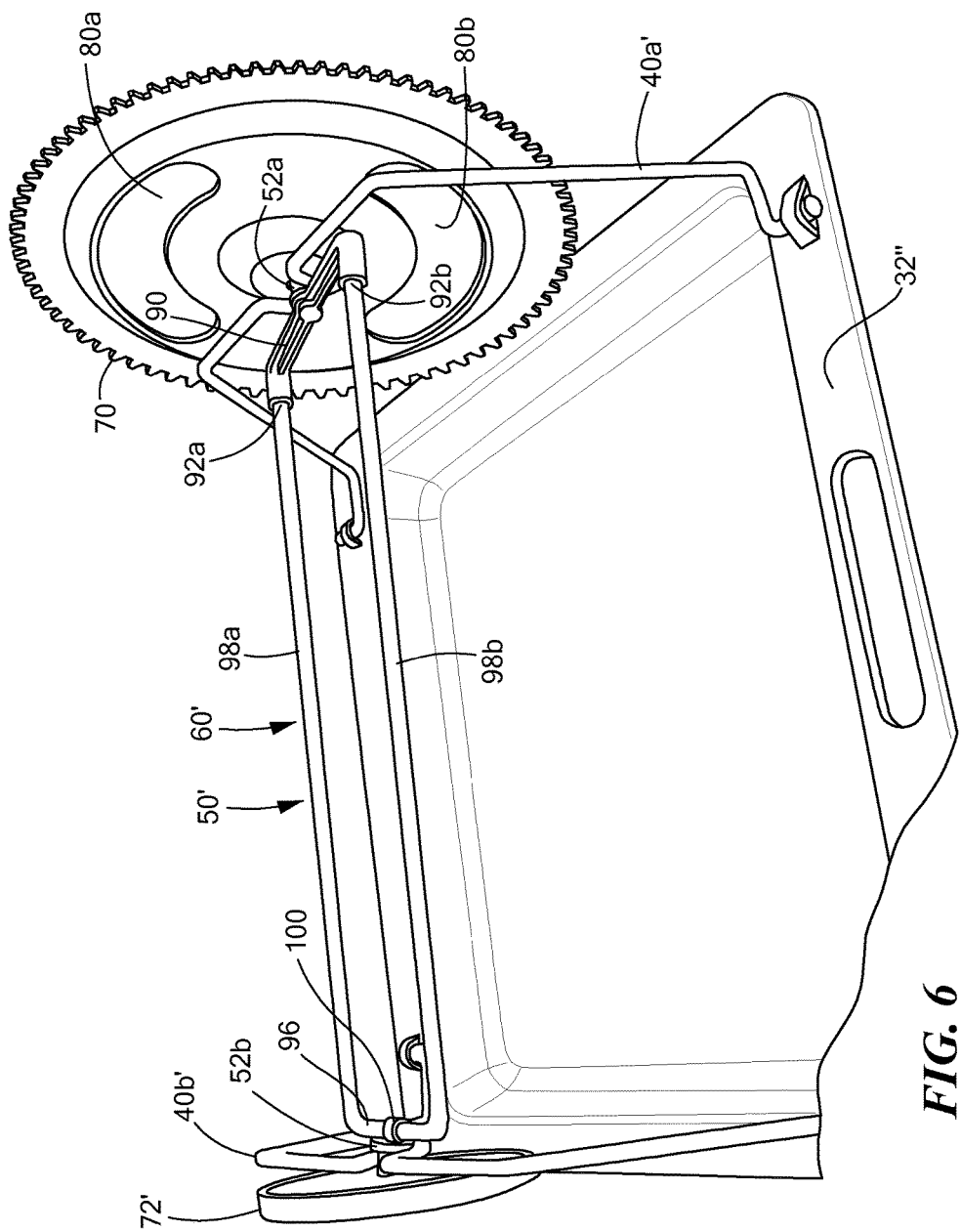
FIG. 6 is a schematic three dimensional front view showing another embodiment of a spit assembly support framework with a spit assembly in accordance with examples of the invention.

FIG. 6 shows another drip pan 32", wire side racks 40a' and 40b', and spit assembly 50' with gear wheel 70 having handle cutouts 80a and 80b for handling the gear wheel. Gear wheel 70 is attached to spool shaped bushing 51a which is attached to yoke member 90 having spaced sockets 92a and 92b. Handle 72' is attached to spool shaped bushing 52b. Spit rod 60' assembly is a U-shaped fork like member with end 96 co joined to spits 98a and 98b the distal ends of which are removably received in sockets 92a and 92b, respectively. Clamp member 100 connects U-shaped end 96 to bushing 52b.

In some preferred embodiments, the drip pan is always used during rotisserie cooking since it supports the spit assembly. The drip pan thus keeps the interior of the cooking enclosure clean. The drip pan is also used to support the spit assembly during assembly, during food preparation, during disassembly, and the like. The food itself need not be handled in order to load the food into the oven or to remove it from the oven. A separate spit assembly support is not required as the drip pan functions to support the food before and after cooking, for seasoning, carving, and the like all the while catching any seasonings and/or drippings from the food. The drip pan, with the rotisserie supports removed, can be used to serve the food. It can also be used as a baking pan Also, the drip pan is simply slid into and out of the oven. The lower oven enclosure side tracks position the drip pan for proper engagement of the spit assembly gear wheel with the interior oven cavity drive gear and the drip pan extends fore and aft in the oven enclosure sufficiently to prevent movement of the drip pan during rotisserie operations since a drip pan rear portion abuts the oven enclosure rear wall and a drip pan front portion abuts the drip pan front door or frame.

In other embodiments, a different type of drip pan/oven enclosure registration means may be used, such as a clamp or clamps securing the drip pan with respect to the oven interior and/or a drip pan which, because of its configuration (size and/or shape), lodges in place within the cooking enclosure properly engaging the spit assembly gear wheel or equivalent with the gear in the oven enclosure driven by a motor.

Figure 7:
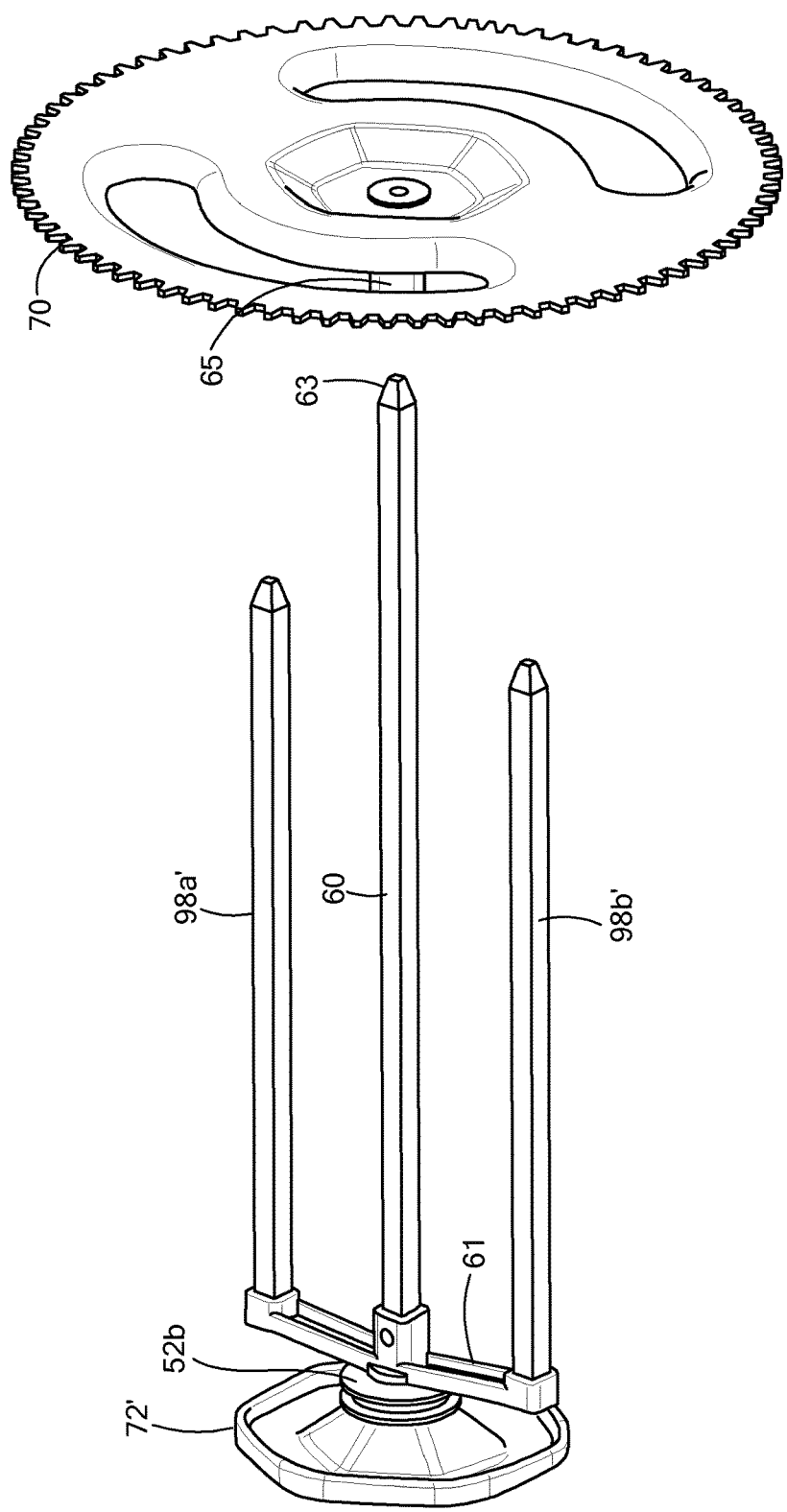
FIG. 7 is a schematic three dimensional front view of another embodiment of a spit assembly.

FIG. 7 shows a spit assembly with yoke 61 attached to bushing 52b of handle 72' supporting center spit rod 60 and two prongs 98a' and 98b' extending about 75% of the length of rod 60. Center spit rod 60 has a square cross section and tapered distal end 63 is received in square socket 65 extending from the bushing of gear wheel 70.

Figure 8:
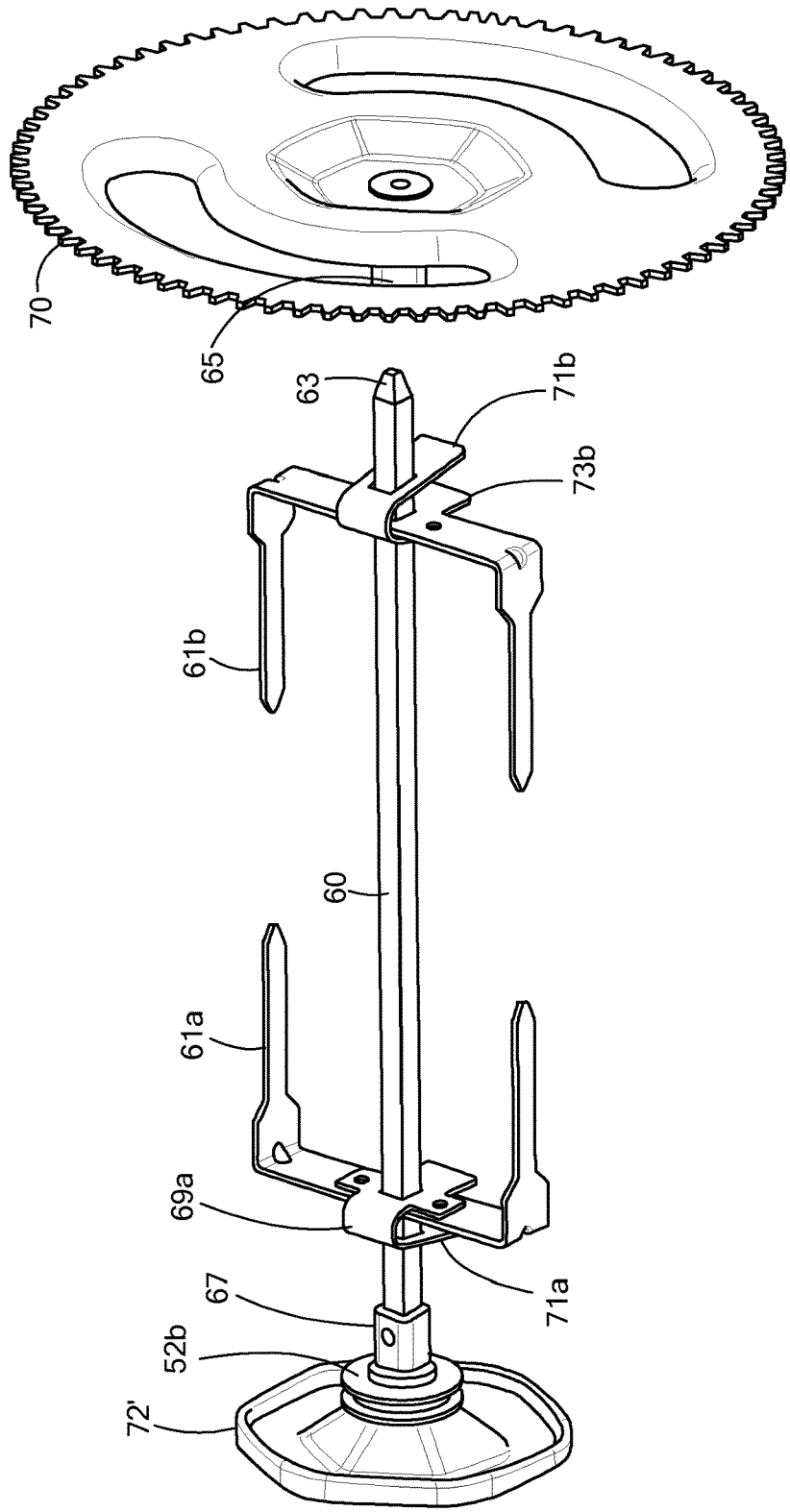
FIG. 8 is a schematic three dimensional front view showing another example of a spit assembly in accordance with the invention.

FIG. 8 show a spit assembly with center spit rod 60 received in socket 67 extending from bushing 52b of handle 72 and received in socket 65 of gear wheel 70. Forks 61a and 61b are adjustable with respect to spit rod 60 via spring member 69a and 69b each having an inner side fixed to a respective fork member and an outer tab 71 with an orifice therethrough for the spit rod 60. Urging the two tabs 71b and 73b together allows sliding of fork 61b along rod 60. Releasing the tabs locks the fork in place on rod 60.

Figure 9:
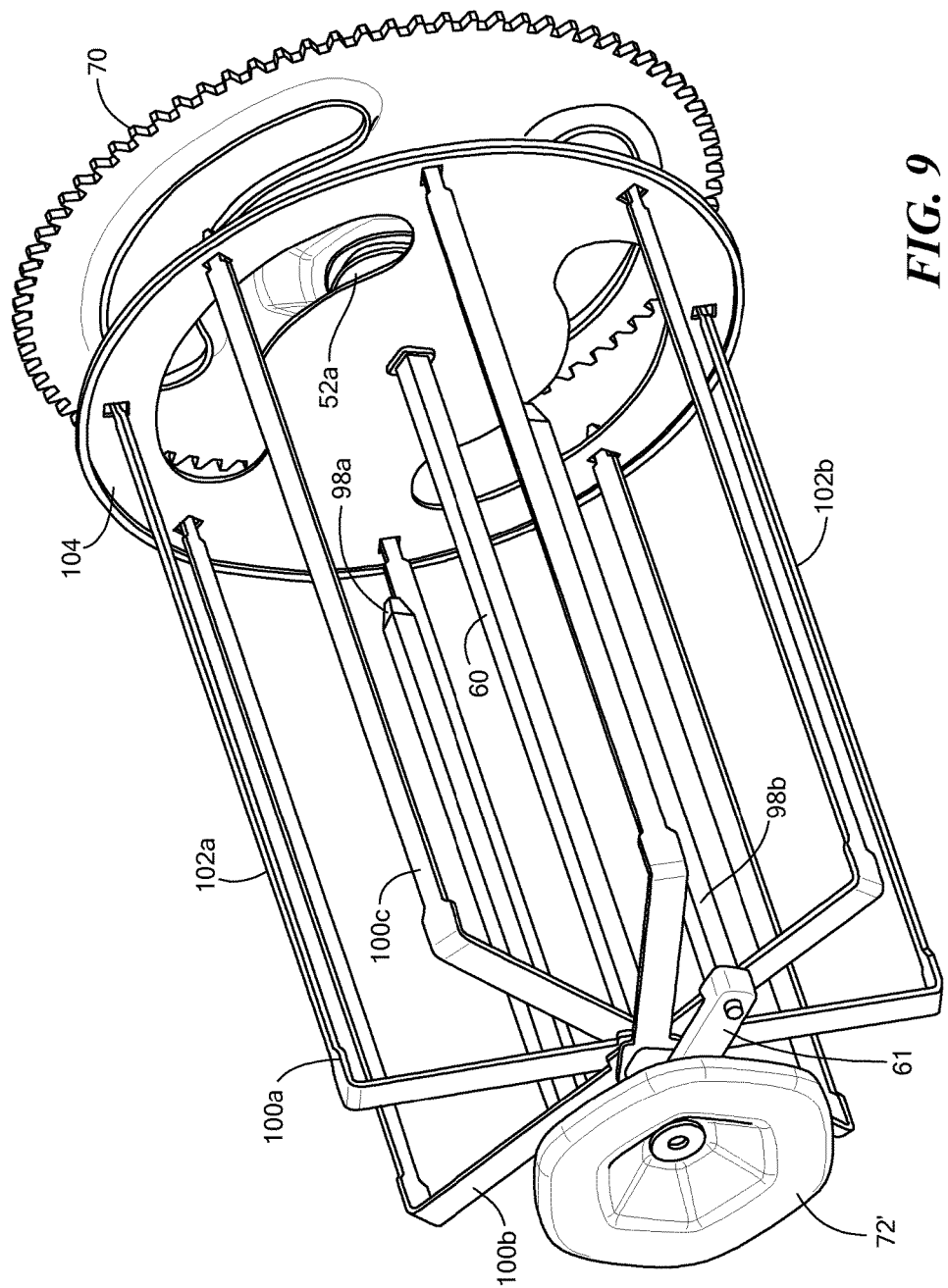
FIG. 9 is a schematic view showing a kabob assembly in accordance with aspects of the invention.

FIG. 9 shows a kabob assembly with three kabob forks 100a, 100b, and 100c slid onto spit rod 60 and each including two kabob holders (e.g., kabob holders 102a and 102b for kabob fork 100a) having distal ends received in kabob retainer 104 with spaced peripheral sockets for the distal ends of the kabob holders. Retainer 104 is slid on spit rod 60 as shown.

Figure 10:
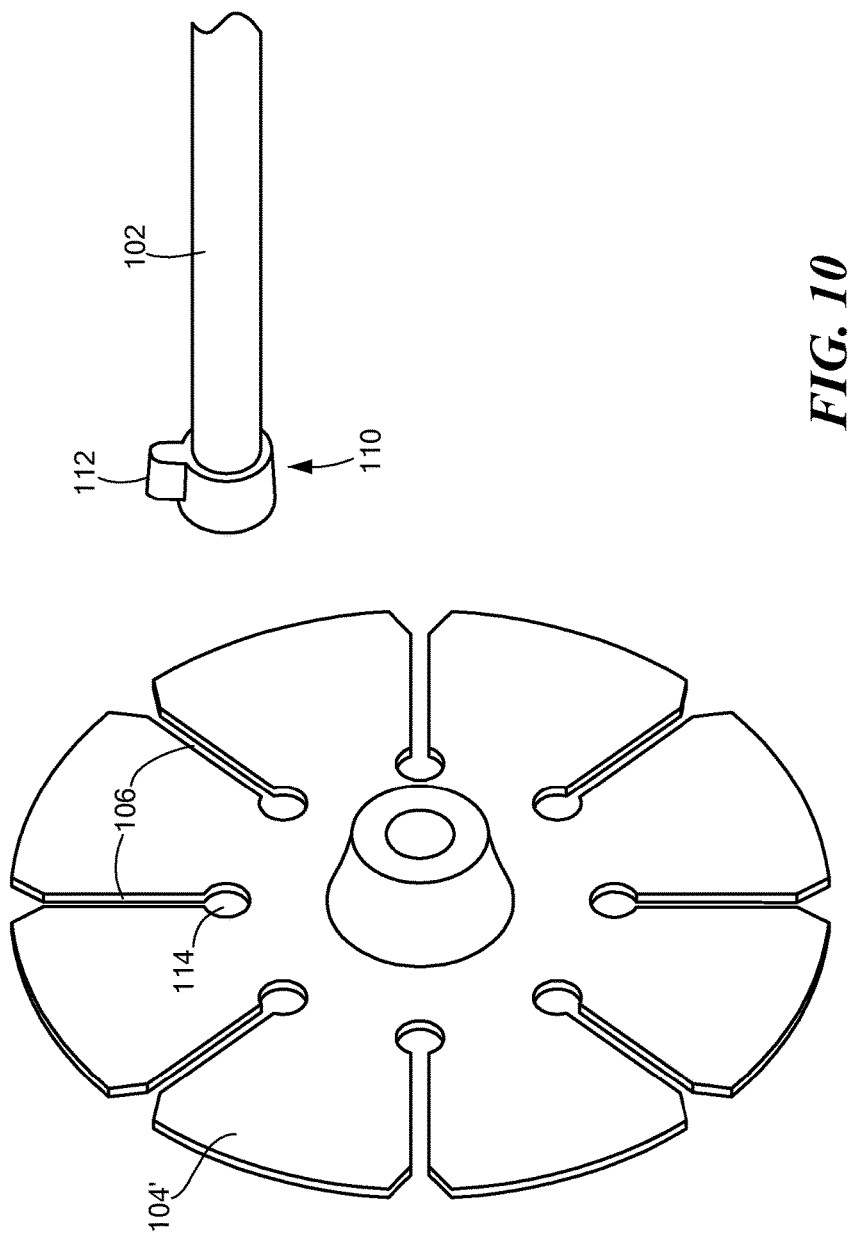
FIG. 10 is a schematic view showing a portion of another kabob assembly in an example of the invention.

FIG. 10 shows a kabob retainer 104' with peripheral slots 106 which receive kabob holders such as kabob holder 102' in a snap lock configuration. End 110 has a cone profile and/or a groove received in slot 106 and opening 114 with tang 112 residing in slot 106. The other end of each kabob holder may include another similar retainer, the retainer shown in FIG. 9, or an equivalent structure.

Figure 11:
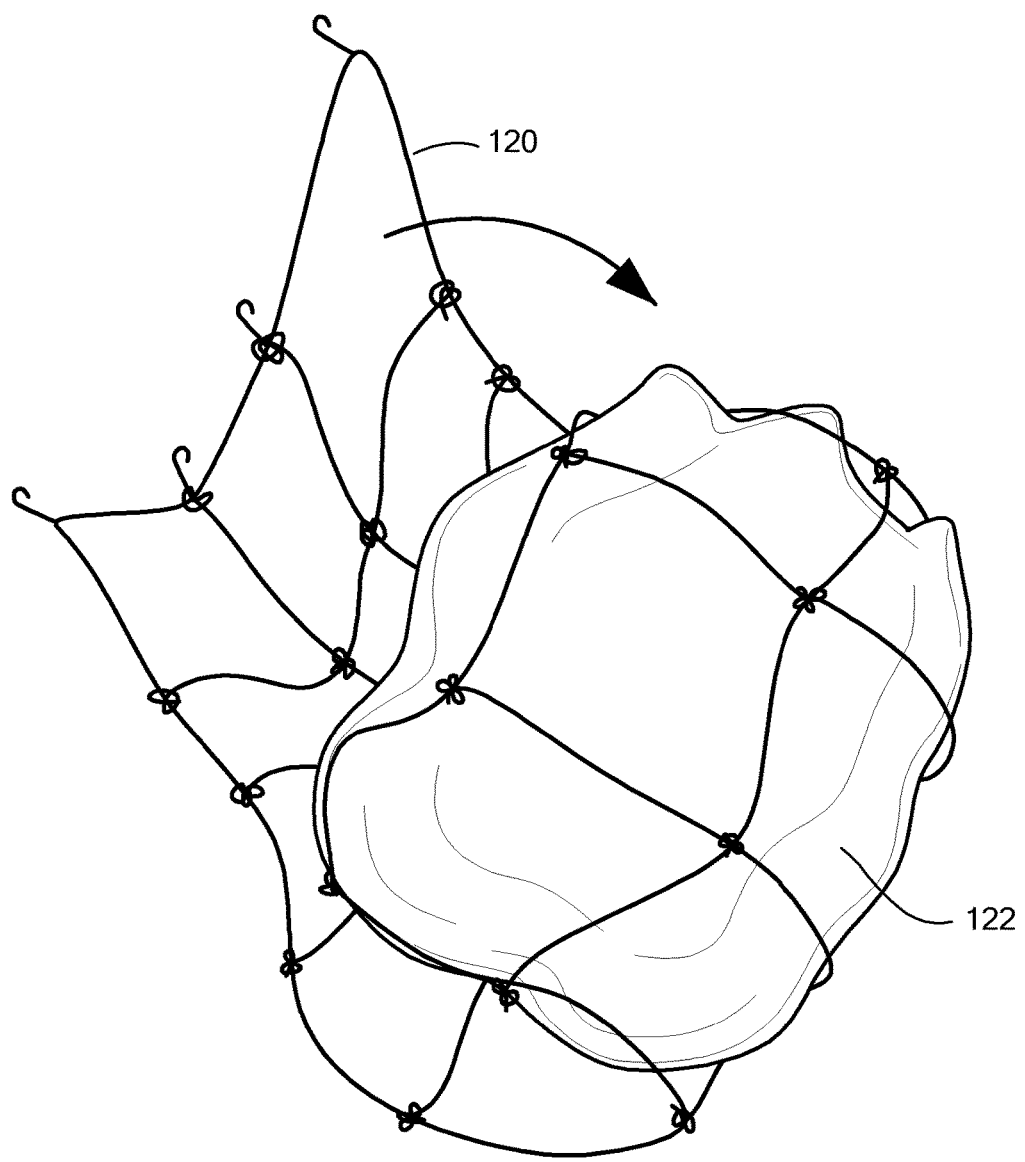
FIG. 11 is a schematic view of a trussing subassembly in accordance with the invention.

FIG. 11 shows trussing 120 for food 122. The trussing may be made of rope, braided metal, silicon material, or the like and/or combinations of such material. Hooks may be included to secure the trussing to the food. The ends of a wire trussing can be used to twist tie the netting securing it to the food. If the truss is made of rope, the ends may extend beyond the net and can be tied to secure the trussing to the food.

Figure 12:
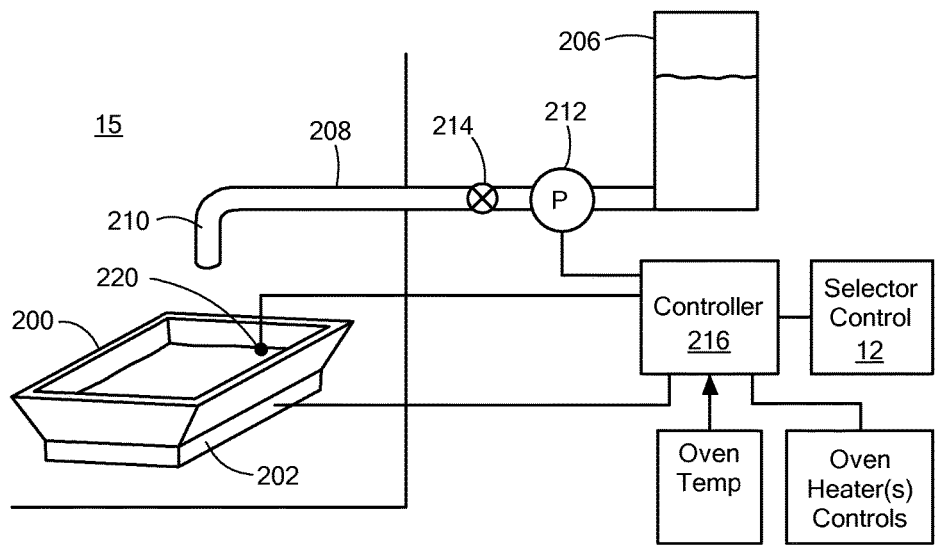
FIG. 12 is a highly schematic view showing an example of a steam generator subsystem associated with the countertop oven of FIG. 1.
Figure 13A:
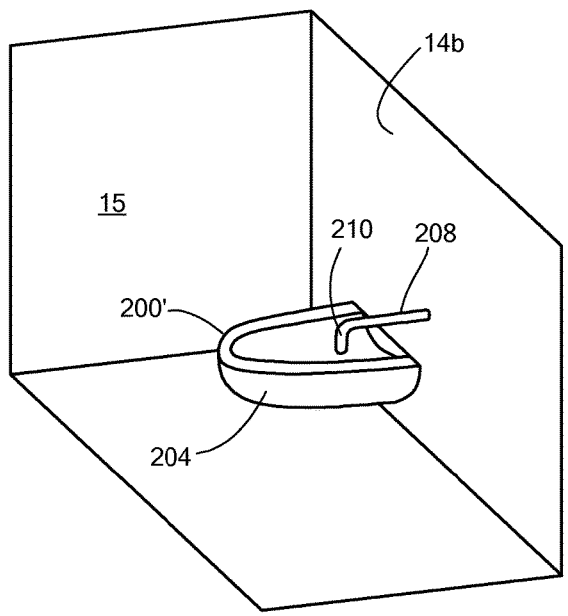
FIG. 13A is a schematic view showing another example of a steam source for a steam infusion subsystem.
Figure 13B:
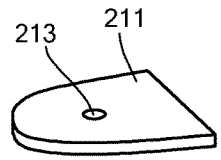
FIG. 13B is a schematic three dimensional view of a steam source cover in accordance with examples of the invention.

For steam infusion with or without rotisserie operations, cooking enclosure 15, FIG. 12 has a cooking heater element (as shown at 22 in FIG. 2, for example) and a separate steam source such as trough shaped metal (e.g., cast aluminum) Teflon coated pan 200, FIG. 12 or 200', FIG. 13A which may be affixed near the bottom rear corner of right side wall 14b within the cooking enclosure. A steam source heater heats the trough shaped pan. In FIG. 12, the heater 202 is secured to the bottom of pan 200. In FIG. 13A, the heater element is within the curved side wall 204 of pan 200', e.g. molded therein. Cover 211 FIG. 13B may be included for pan 210' with steam exit hole 213. Cover 211 keeps drippings and the like from contaminating the interior of pan 200'

Fluid reservoir 206 is typically attached externally to the cooking enclosure and can be filled with water by the user. The fluid reservoir can be removed from the countertop oven in some embodiments in order to be filled at the sink. Conduit 208 leads from reservoir 206 to the steam source as shown with distal end 210, FIGS. 12 and 13 just above pans 200 and 200'.

In this way, the problems associated with dripping water on the oven heating element are avoided. This prevents corrosion of the oven heating element and/or cooling of the oven heating element during cooking operations when the steam infusion mode is selected. Steam is generated independent of the main oven heating element(s). One benefit of such a feature is to provide a low temperature (e.g., 140° F.) steam filled environment for functions such as bread proofing, keeping food warm and moist, and the like. Another benefit is the steam source heater can be de-energized if the oven temperature (by virtue of the oven heater element(s)) is hot enough to heat the steam source to a temperature sufficient to create steam when water drips on it.

The water may be gravity fed to the steam source or a pump 212 may be included and/or one or more valves 214 may be included. Controller 216 may control valve 214 and/or pump 212 to deliver water to the steam source sufficient to produce steam at a rate between about 6-7 grams per minute. Controller 216 may be a microcontroller, one or more processors, an application specific integrated circuit, a field programmable gate array, or may include analog and/or digital circuitry. In some embodiments, controller 216 is distributed amongst a plurality of devices and/or electronic chips and/or subassemblies or subsystems. A microcontroller may control the oven heater element, a fan, valve 214, and/or pump 212 based on input from selector controls 12, FIG. 1. Various relays, thyristors, and/or a thermostat may also be used. Valve 214 may be a manually controlled orifice or an electronically activated gate to provide a pulsed or variable flow of fluid.

Controller 216 controls the oven heater controls as shown in FIG. 12 based on input from a temperature sensor to control the oven temperature as desired based on selector control 12.

Controller 216 also functions to sense the desired input from a selector control 12 (see FIG. 1) for the steam infusion mode. When the oven is sufficiently hot, the steam source heater need not be activated since the cooking enclosure heater will sufficiently heat the pan 200, 200', FIGS. 12-13 to a temperature necessary to produce steam as water in conduit 208 drips onto the pan.

In other cooking modes, the oven temperature may be lower and the steam source is not hot enough to produce steam or to produce steam at a sufficient rate without energizing the steam source heater.

Accordingly, temperature sensor 220, FIG. 12 (e.g., an NTC thermistor) is included and provides to controller 216 the temperature of the steam source pan 200, 200'.

Figure 14:
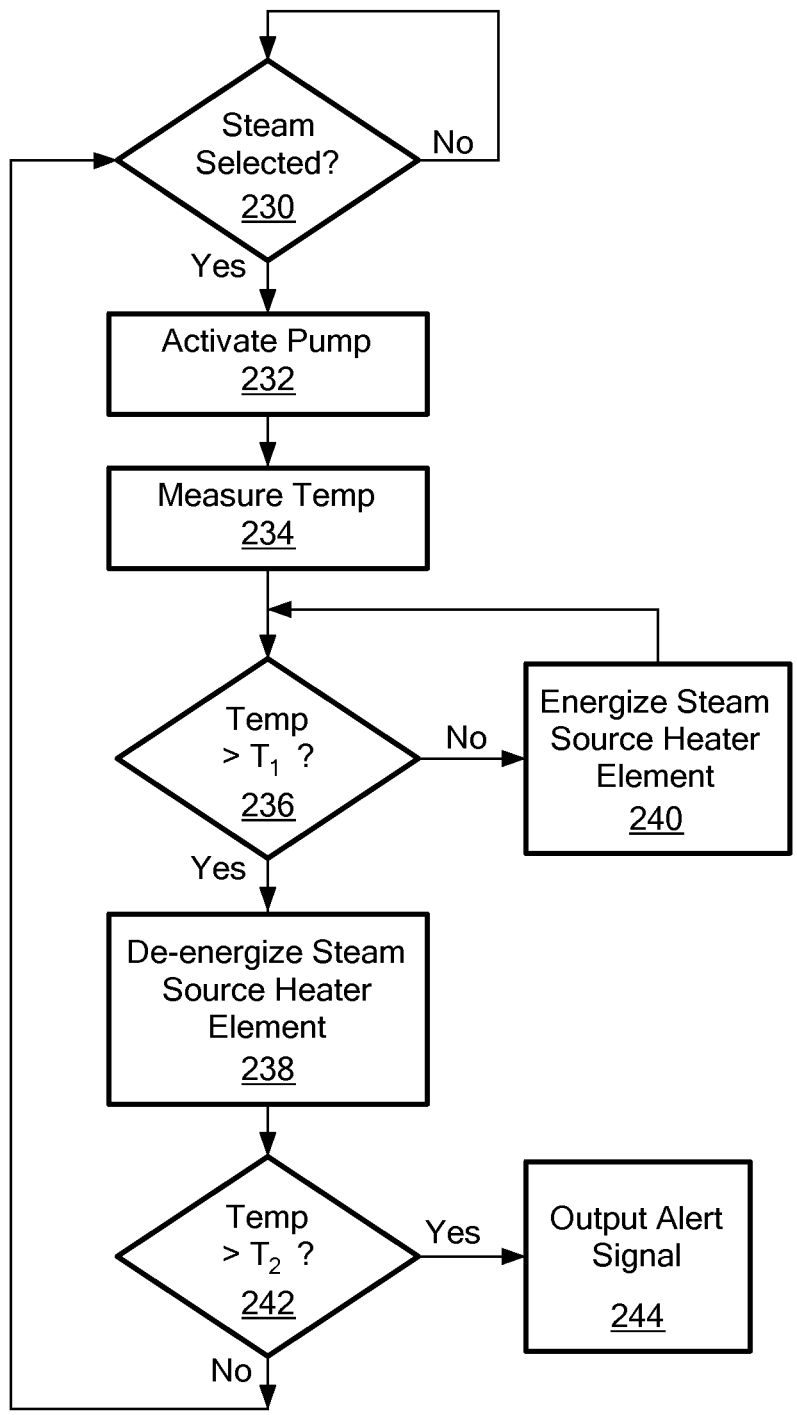
FIG. 14 is a flow chart depicting a method associated with the invention and/or the programming and operation of the controller of FIG. 7.

As shown in FIG. 14, controller 216 is configured (e.g., programmed) to detect whether the steam mode is selected, step 230 and if so, to activate pump 212, FIG. 12, and/or open valve 214, step 232, FIG. 14. If the steam mode is not selected, the pump is not activated and/or the valve remains closed. The temperature as provided by the thermistor is measured and/or sensed, step 234 and if the temperature is above a predetermined temperature $T_1$, step 236, then the steam source heater element (202, FIG. 12) is de-energized (or turned on low), step 238 or left de-energized if already de-energized. If the temperature measured by the temperature sensor is below $T_1$, step 236, then the steam source heater element is energized (or turned on high), step 240. In cases where the temperature measured by the temperature sensor exceeds another predetermined temperature $T_2$, step 242, an alert signal may be output, step 244 (e.g., to an audible alarm, an indicator lamp, or the like). Such a high temperature could indicate a problem with the operation of the countertop oven or the need to fill the fluid reservoir. In one embodiment, $T_1$ is 220° F. and $T_2$ is 250° F. Thereafter, the steam source heater and pump are periodically turned on (and/or the valve is opened) and the temperature read. If the temperature falls below $T_2$, that indicates water has been added to the reservoir. Normal operation then resumes. If the temperature does not fall below $T_2$, the pump is turned off (and/or the valve is closed) and the heater is turned off. The steps of periodically turning the heater and pump on (and/or opening the valve) and reading the temperature continue. LED indicators can be energized to flash throughout this cycle until the temperature falls below $T_2$.

In some embodiments, the temperature of the steam pan is maintained at a predetermined set point by control of the steam source heater and/or controlling the amount of water supplied to the pan.

Figure 15:
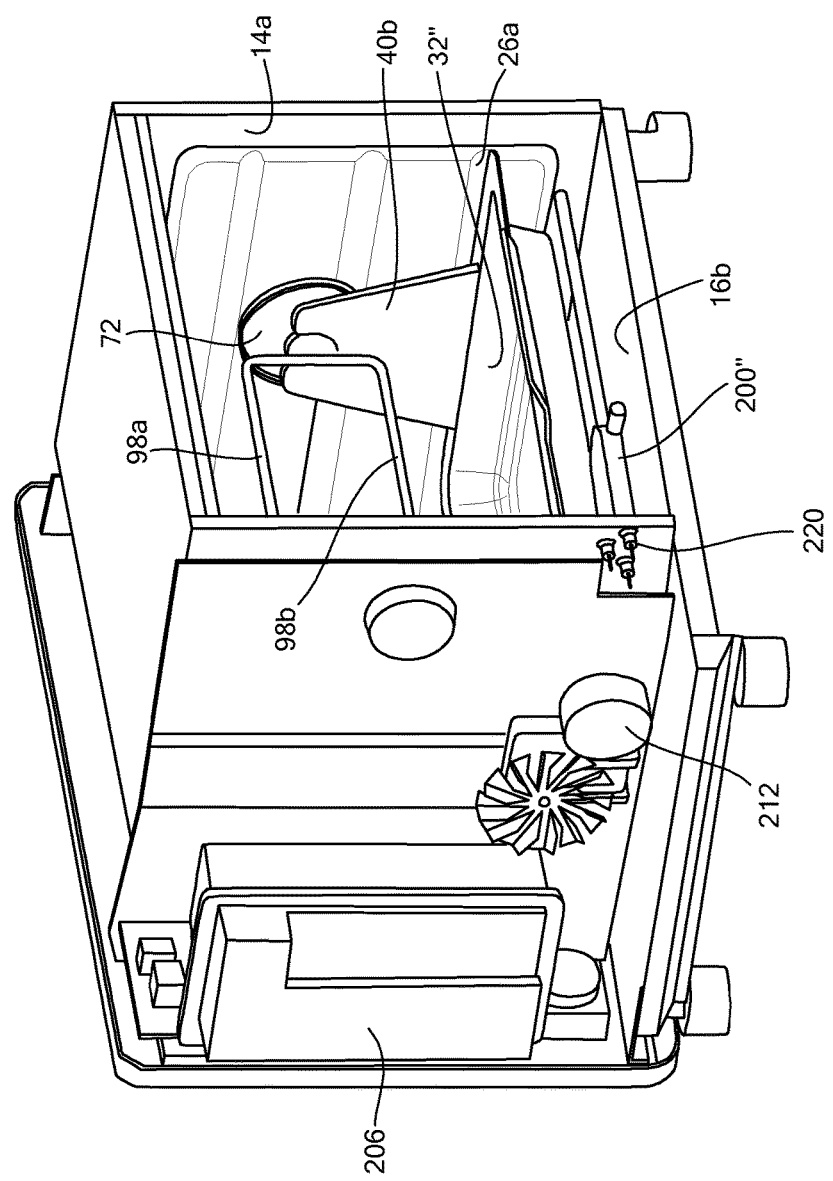
FIG. 15 is a schematic view of a cooking system according to one embodiment of the present disclosure.

FIG. 15 shows a removable fluid reservoir 206 and piston pump 212 driven by an AC motor. Cast aluminum steam source 200" is also shown. Fan 300 is also shown. Also shown is temperature sensor 220 for the steam source heater. The temperature sensor for the oven is preferably near the top right side front of the oven cavity.

Figure 16:
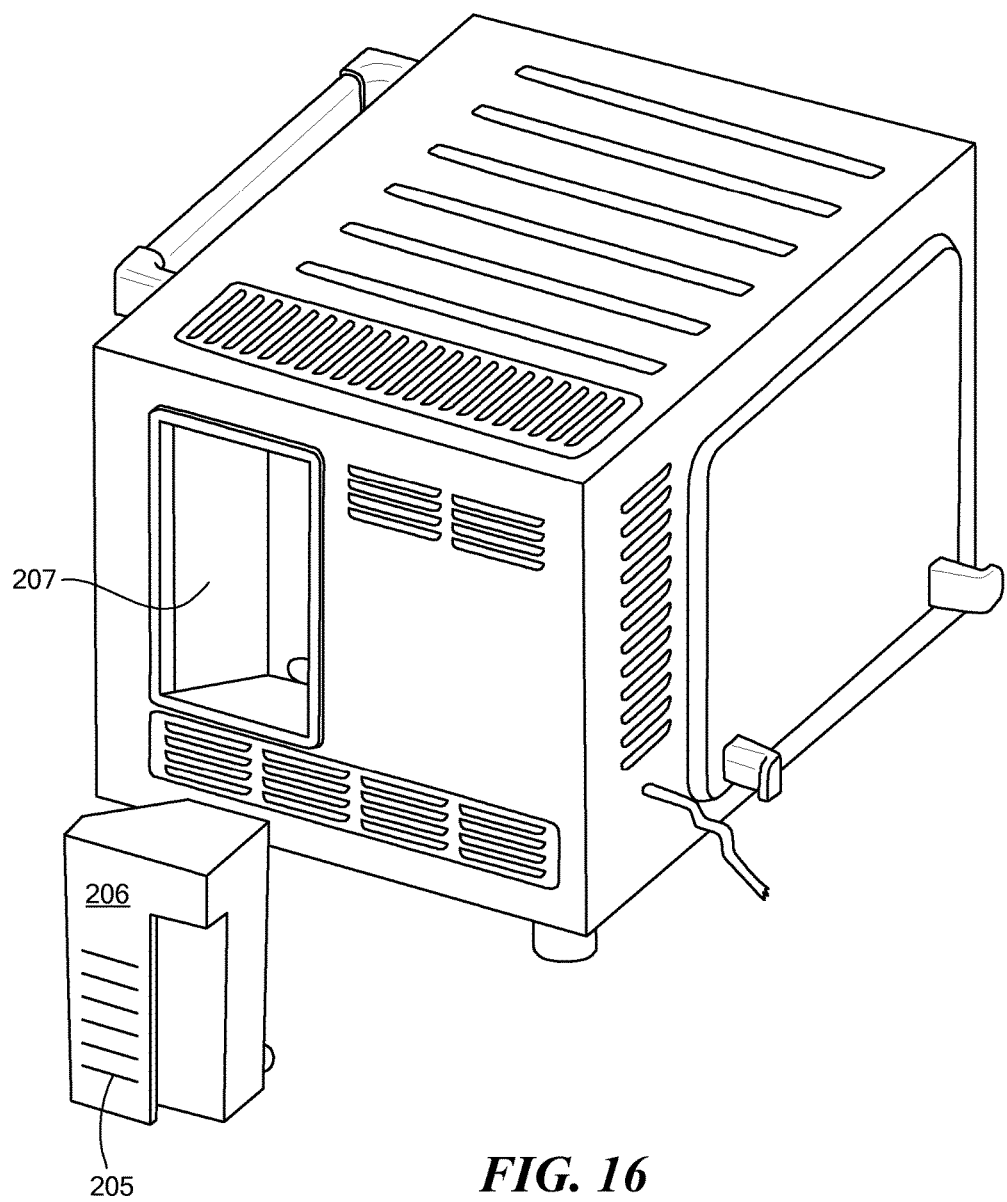
FIG. 16 is a schematic view showing the fluid reservoir removed.

FIG. 16 show fluid reservoir 206 removed from side wall receptacle 207 for filling. When the reservoir is removed, valve 214 automatically closes. Reservoir 206 may be made of clear or otherwise see-through plastic so the user can monitor the fluid level within the reservoir. Reservoir 206 may have markings indicating the water level as shown at 205 to dictate a desired steam duration.

Because of independent steam trough heater 202, FIG. 12, controller 216 can be programmed to provide steam independent of the control of the oven temperature. In one example, a steam bake with browning may be selected via selector control 12. Controller 216 then controls the oven temperature to about 375° F. and supplies steam at a rate of 6-9 g/min for about 20 minutes. Then, the steam ceases and the food product is browned at 375° F. for the final 10 minutes of cooking. In other examples, the steam rate is lowered for the final 10 minutes of cooking.

In another example, steam alone is used at the beginning of the cooking cycle or a low oven temperature is maintained (e.g., 120° F.) and, at the end of the cooking cycle, no steam is used and the oven is maintained at a higher temperature of 400° F.

Thus, controller 216 controls whether or not steam is used, the rate of steam infusion, and the time steam is used as well as whether or not the oven heating element(s) are turned on, the power supplied to them, (oven temperature), and the length of time they are on.

In this way, the steam source heater can also be protected from overheating, water will not be introduced into the cooking chamber that will not be boiled away by the steam source (boiler), and the like.

In one example, if the temperature of the steam source exceeds a predetermined temperature (e.g., 375° F.), the steam source heater can be turned off and/or cycled on and off In some examples, the pump is left on. When the reservoir is refilled, water again strikes the steam source. When the steam source heater is cycled on and the temperature decreases, that indicates the reservoir has been refilled and now the steam source heater can be left on (in the steam infusion mode).

Figure 26:
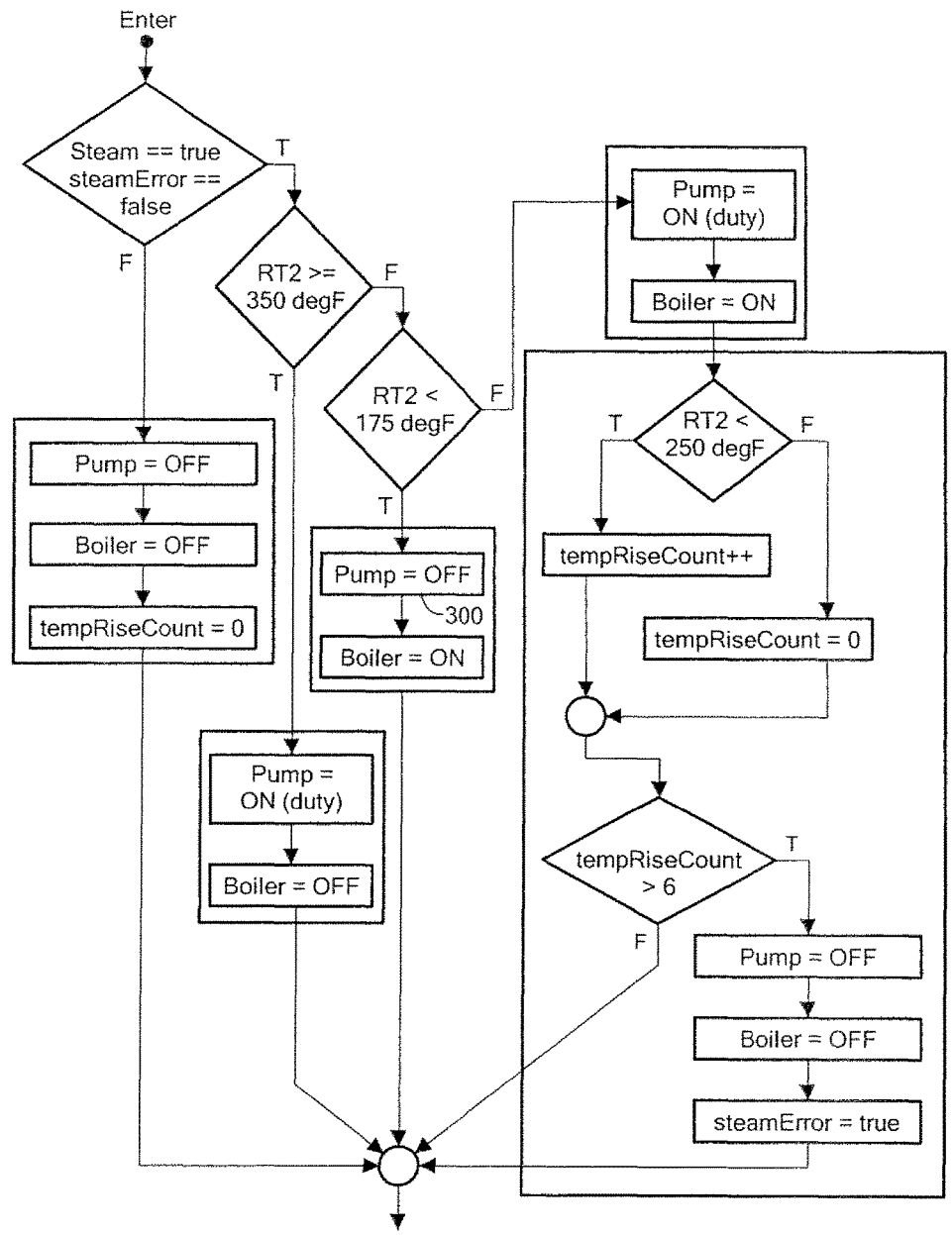
FIG. 26 is a flow chart depicting the programming associated with the controller of FIG. 7.

If the temperature is less than a predetermined temperature (e.g., 175° F.), the pump is turned off as shown at 300 in FIG. 26 so water does not contaminate the cooking enclosure and/or leak therefrom. The steam source heater may be left on or turned off.

Figure 17:
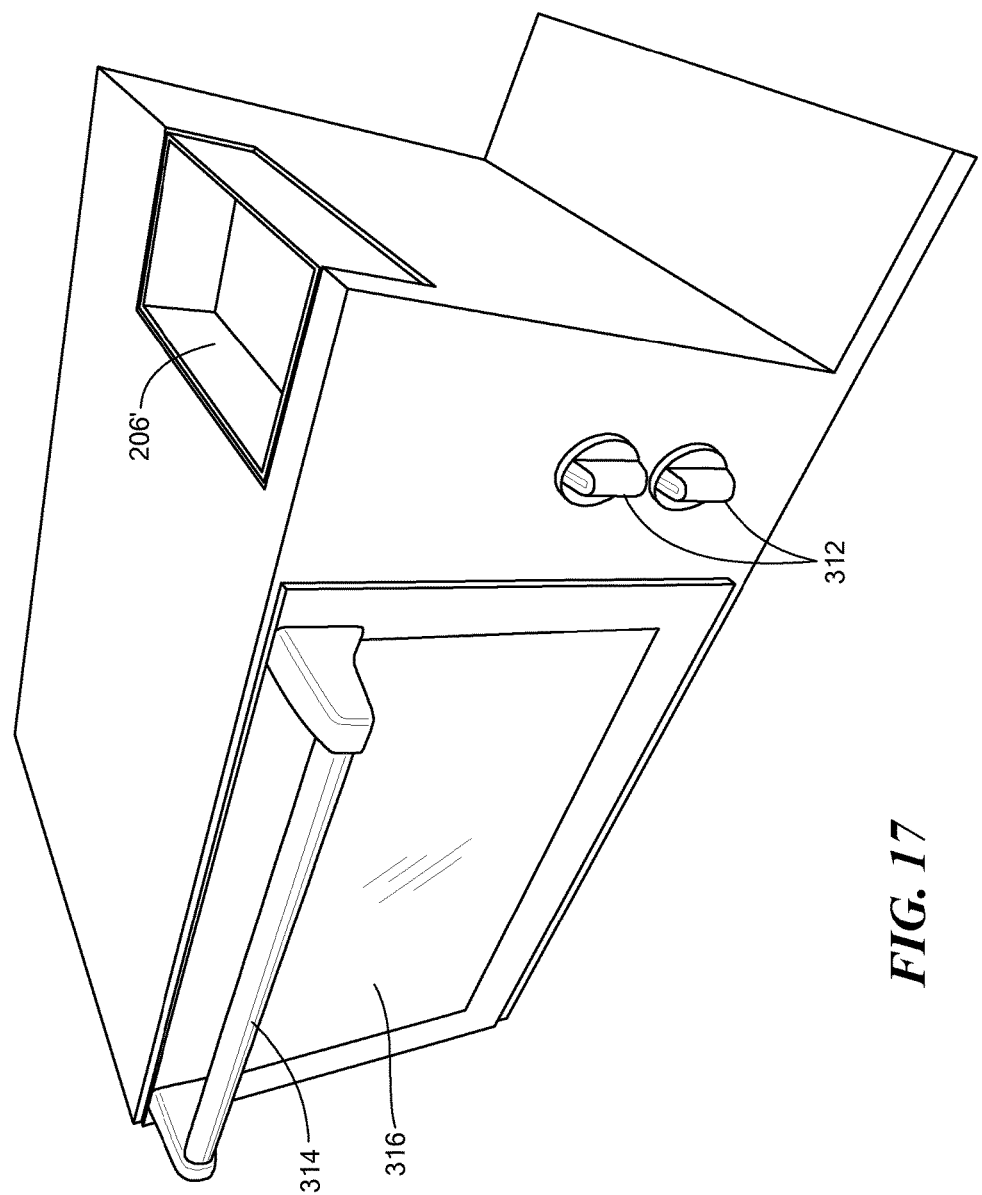
FIGS. 17-18 are schematic views of another fluid of a cooking system.

FIG. 17 is a perspective view of a cooking system according to one embodiment. As shown, the cooking system can include one or more control knobs 12 for manipulating temperature and/or time within the cooking system. The control knobs 12 may also be used for controlling other features of the cooking system 10 as can be appreciated by one skilled in the art. In some instances, the control knobs 12 can also include pre-determined timing and/or cooking programs. In one embodiment, the cooking system is a convection oven with steam infusion capabilities. As shown, the cooking system includes a stainless steel handle 314 on a front glass door panel 316 for access to the interior of the cooking system 10. As can be appreciated by one skilled in the art, handle 314 and the door panel 316 can be formed of any suitable material and can come in a variety of configurations (e.g., side of the oven, top of the oven). In one embodiment, the cooking system includes a right side water reservoir 206' for providing water to the interior of the cooking system.

Figure 18:
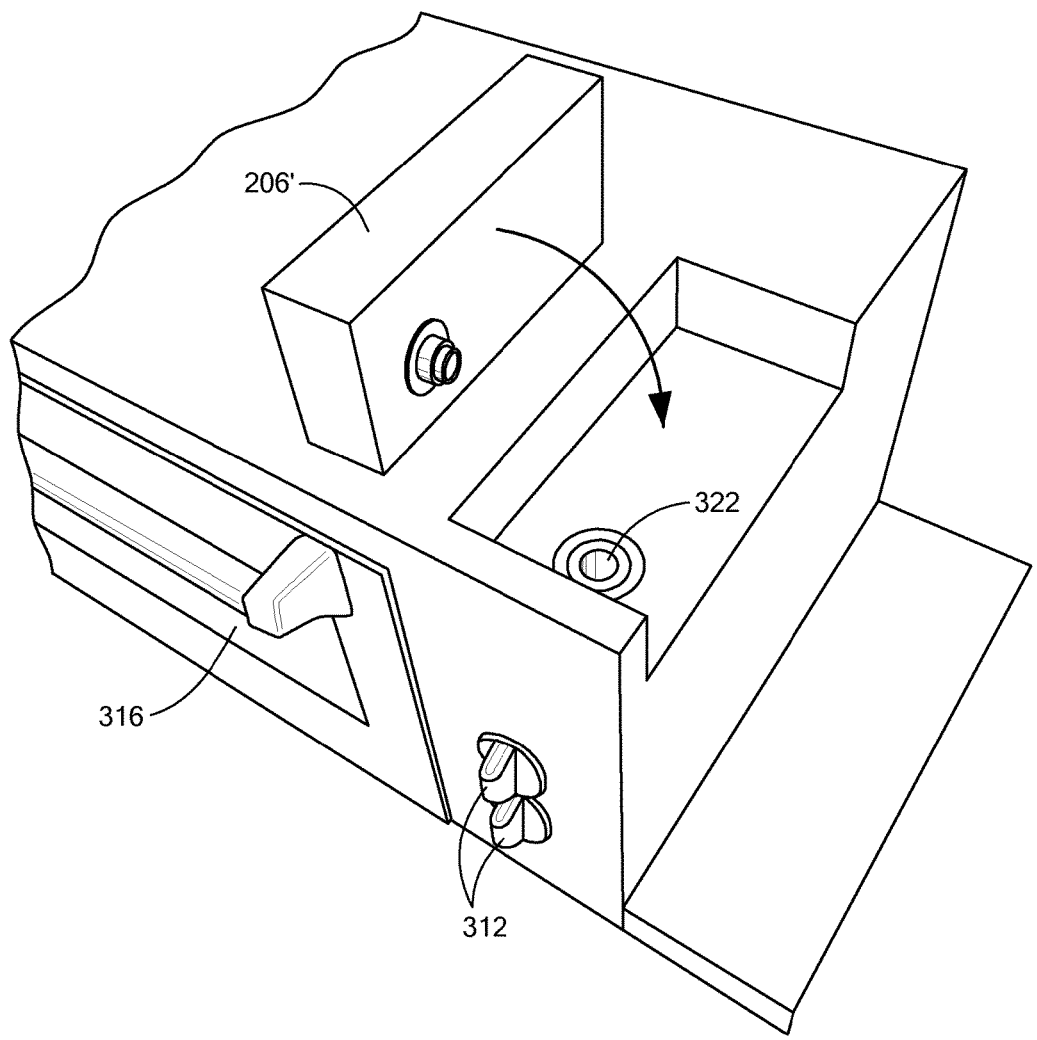

FIG. 18 is a perspective close-up view of the water reservoir 206'. As shown, the water reservoir 206' can be detached for refilling with water as necessary. In some instances, the water reservoir 206' can be integrated to the cooking system. Water within the water reservoir 206' can be provided to the interior of the cooking system 10 via a water inlet 322 that is in communication with the modular water reservoir 206'. Additional pipes and/or valves (not shown) may be used to direct the water throughout the interior of the cooking system as necessary.

Figure 19:
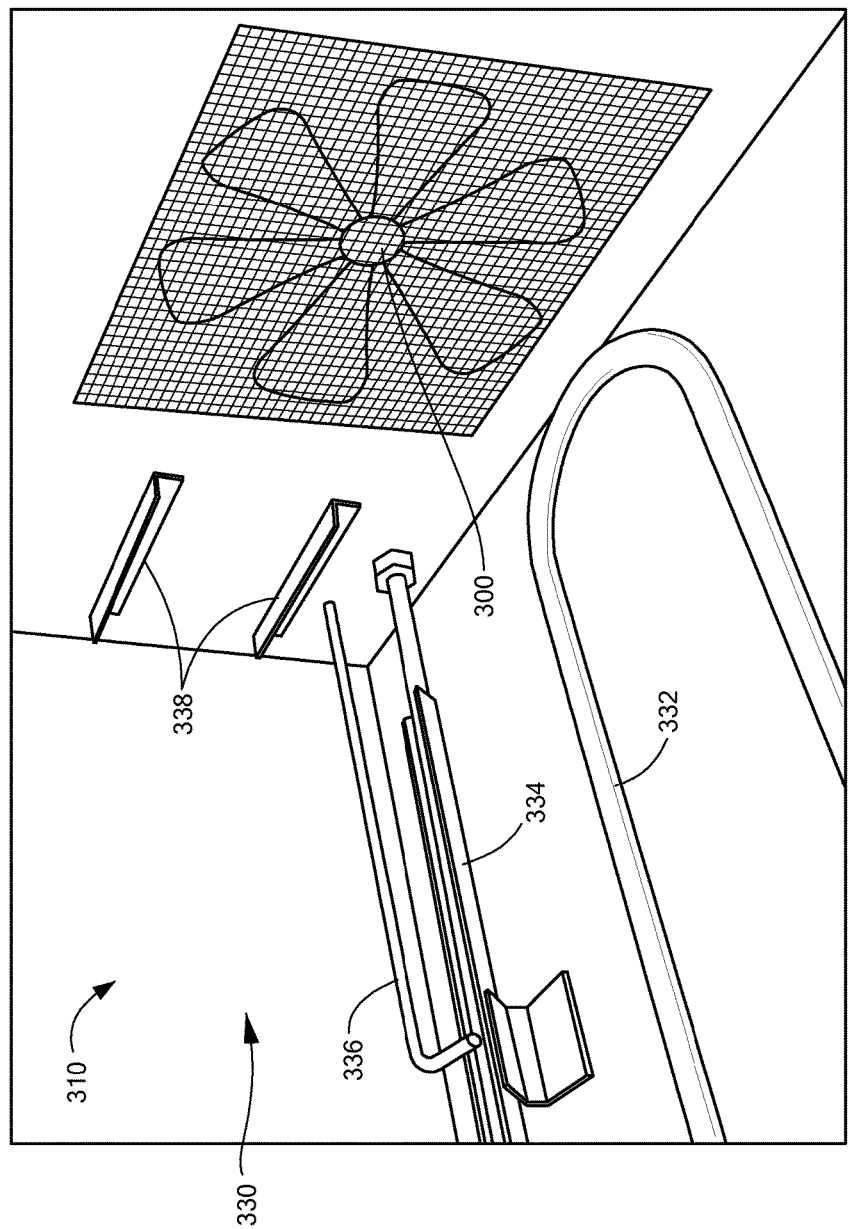
FIG. 19 is a schematic view of another steam source within a cooking enclosure.

FIG. 19 is a perspective view of a heating system within the cooking system. As shown, the heating system can be housed within chamber 330. In one embodiment, the heating system includes a heating element 332 that can be powered by a power supply (not shown) within the cooking system via an electrical outlet (not shown) and controlled by controller 216, FIG. 12. At least one steam source channel 334 can be found adjacent to an underside of the heating element 332. In one embodiment, the channel 334 can be substantially disposed about and surround the underside of the heating element 332. In another embodiment, the channel 334 can be integrated with the heating element 332. In yet another embodiment, the channel 334 can be detachably coupled to the heating element 332. In some embodiments, the channel 334 is able to maintain fluid communication with the heating element 332.

In one embodiment, an apparatus 336 can be in communication with the heating element 332 to deliver water to the channel 334. The water for the apparatus 336 can be retrieved from the water reservoir via pipes and/or valves. In one example, the objective is to deliver water from the apparatus 336 to the channel 334. The water is converted to steam. In one embodiment, the heating element 332 is operable to convert water along the length of the channel 334 to steam.

In some embodiments, the rate at which water can be delivered to the steam source may be capable of producing steam rates in the range of about 2 grams per minute, or about 3 grams per minute, or about 4 grams per minute, or about 5 grams per minute, or about 6 grams per minute. In other embodiments, the steam rate can be in the range of between about 2 grams per minute to about 6 grams per minute. In some instances, the steam rate can be less than 10 grams per minute, or less than 5 grams per minute. In other instances, the steam rate can be greater than 1 gram per minute, or greater than 3 grams per minute, or greater than 7 grams per minute. 6-7 grams per minute may be preferred.

In one embodiment, the bottom heating element can have a substantially linear configuration. In another embodiment, the heating element can have a substantially serpentine configuration. The serpentine configuration may minimize the amount of cold sections in the cooking system and eliminate cold spots that can develop in the cooking system. In yet other embodiments, the heating element can have a combination of linear and serpentine configuration, among other suitable configuration as can be appreciated by one skilled in the art. In some embodiments, the objective of the heating element is to provide a better heat distribution and cooking uniformity throughout the cooking system. The heating element is also capable of providing cooking, baking and broiling functions, among others, to food products within the cooking system.

The cooking system can also include an air flow system 330 such as a fan to facilitate air flow within the cooking system. This will be described in more detail in subsequent figures and discussion.

Figure 20:
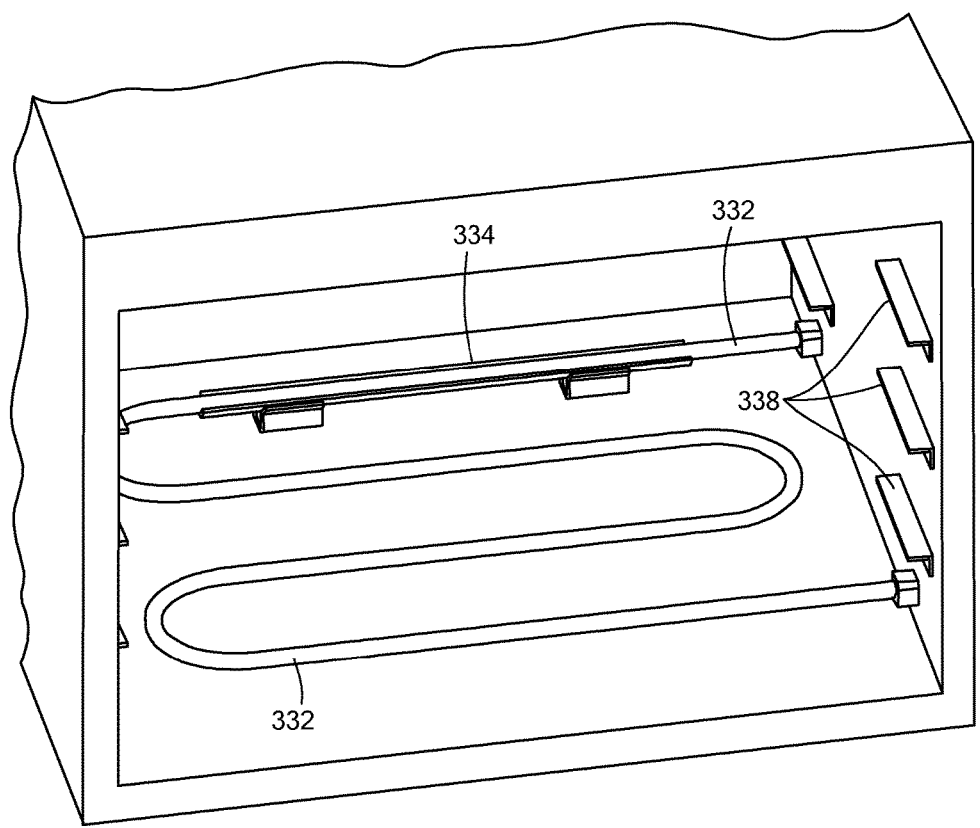
FIG. 20 is a schematic view of the steam source of FIG. 14.

FIG. 20 is a schematic view of a heating system. As shown, the chamber can house the serpentine heating element 332 as well as the removable water collar channel 334. In one embodiment, the disclosed cooking system is capable of introducing steam throughout the chamber for cooking food products contained therein via a water delivery apparatus 36, the heating element 332 and the channel 334 to add humidity. Optionally, the chamber 30 can be a convection oven capable of cooking food products with or without the infusion of steam provided by the water delivery apparatus. In other words, the cooking system can function like a traditional convection oven in one instance. In other instances, the cooking system can function like a convection oven with steam infusion to provide enhanced cooking capabilities to the food products.

Figure 21:
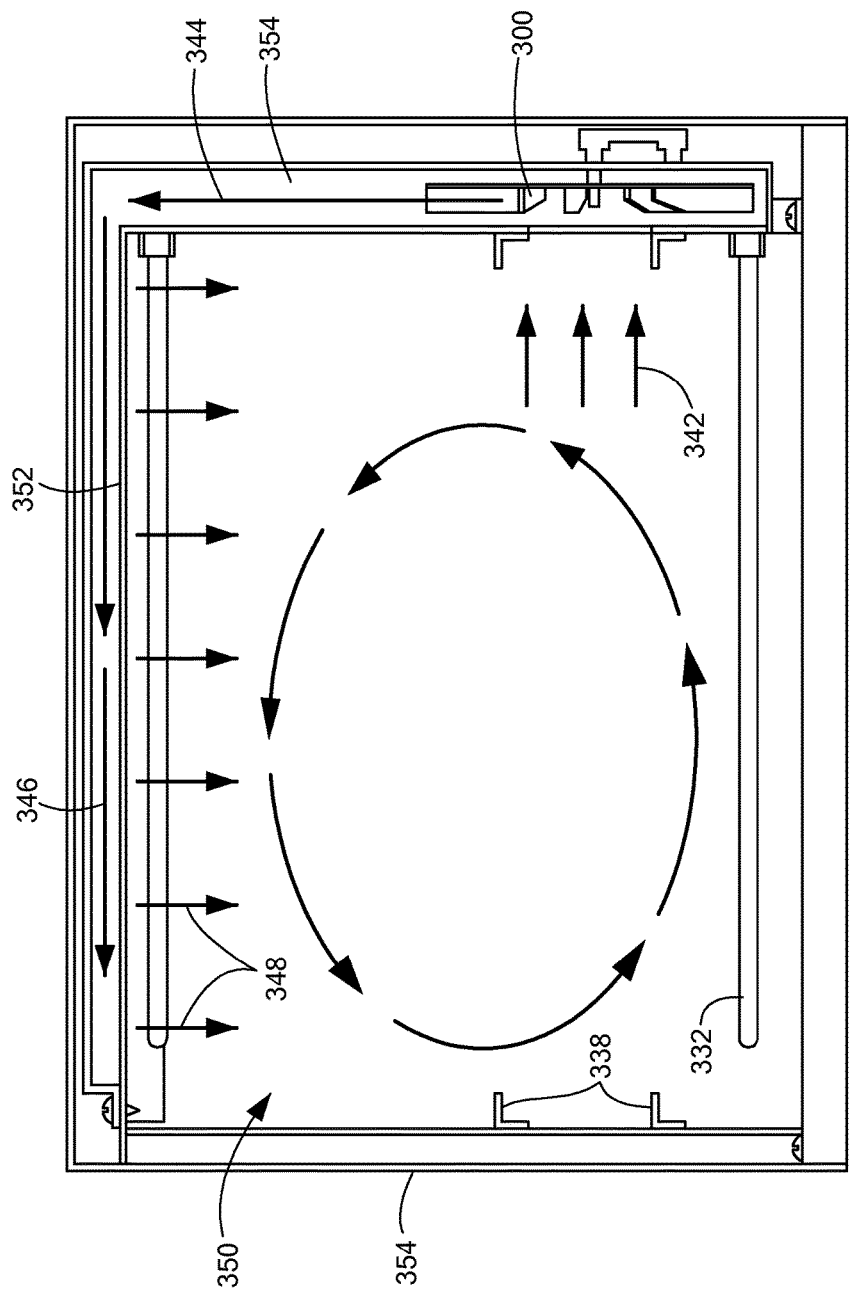
FIG. 21 is a schematic view of an air flow system for a cooking system.

FIG. 21 is a schematic view of an air flow system of a cooking system. In one embodiment, the air flow system includes a housing 350 where the housing 350 is capable of receiving food products therein. Like above, the food products can include the likes of bread, rice, pasta, vegetables, fruits, dairy products, meats, fish and poultry, among others.

As shown, the housing 350 includes at least one top wall 352 and at least one side wall 354. In one embodiment, the air flow system includes an apparatus 300 adjacent one of the side walls 354. In operation, the apparatus 300 is capable of facilitating air flow throughout the air flow system.

In one embodiment, the apparatus 300 is capable of facilitating movement of the air flow out of the housing 350 at a first orientation 342. The air flow may subsequently move up the side wall 354 at a second orientation 344, followed by movement along the top wall 352 at a third orientation 346. Finally, the air flow may be redirected back into the housing 350 at a fourth orientation 348. In this instance, the four orientations 342, 344, 346, 348 are able to form a substantially circular air flow pathway within the housing 350 to facilitate cooking of the food products contained therein. Although the air flow has been disclosed as moving in a counterclockwise direction, it will be appreciated by one skilled in the art that the air flow pathway can also flow in a clockwise direction, or a combination of the two different directions as necessary depending on the design of the cooking system. Preferably, the airflow is proximate the heating elements (top and/or bottom).

In one embodiment, the apparatus 300 is a fan, which can be powered by a power supply out to an electrical outlet similar to that of the heating element 332 as discussed above. In another embodiment, the fan has a blade diameter in the range of from about 25 mm to about 125 mm. In some embodiments, the blade diameter of the fan can be less than about 200 mm, or less than about 150 mm, or less than about 100 mm, or less than about 50 mm, or less than about 25 mm. In other embodiments, the blade diameter of the fan can be greater than about 10 mm, or greater than about 35 mm, or greater than about 75 mm, or greater than about 125 mm, or greater than about 225 mm. It will be appreciated by one skilled in the art that a variety of fan blade lengths and thicknesses may be utilized in the presently disclosed cooking system. In operation, the fan is able to provide an increase of at least about 50% in volumetric capacity with greater air flow and enhanced convective heat transfer. In some instances, the increase can be at least about 10%, or at least about 20%, or at least about 30%.

Figures 22, 23:
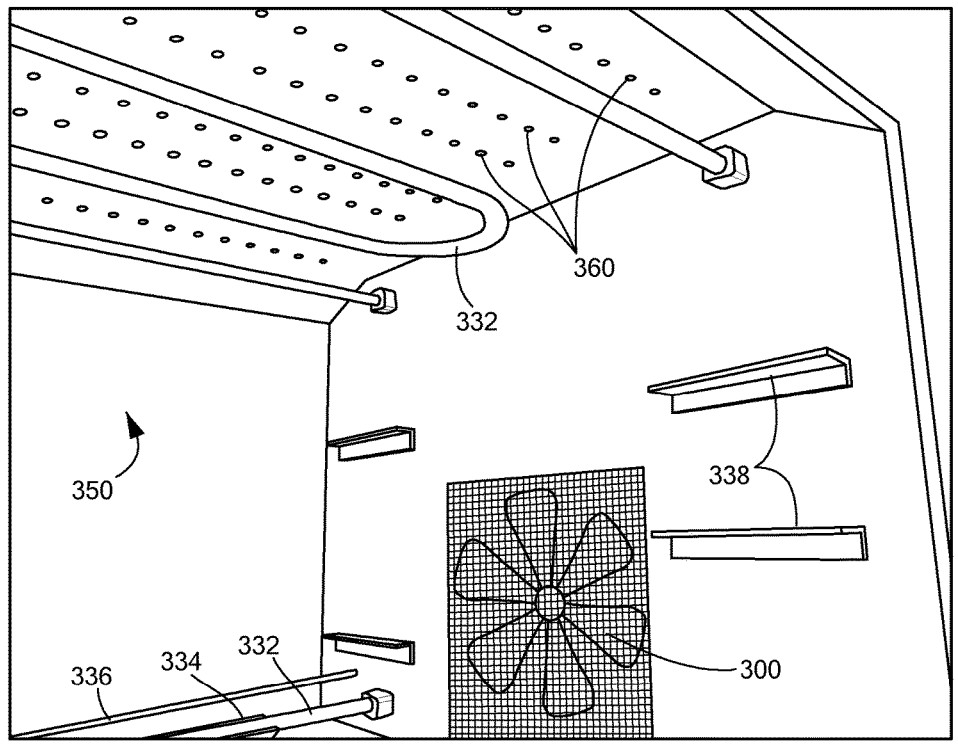

FIG. 22 is a perspective view of an air flow system. In one embodiment, the top wall 352 of the housing 350 may include a plurality of apertures 360 to facilitate air flow throughout the housing 350. Furthermore, in some embodiments, additional heating elements 332 may be disposed adjacent the top wall 350 to facilitate additional heating of food products within the housing 350 as necessary. In operation, the plurality of apertures 360 may facilitate greater uniformity and/or distribution of the air flow and subsequently the heat transfer distribution throughout the housing 350 for enhanced cooking of the food products contained therein.

In some embodiments, the cooking system can include a combination of the air flow system and the heating system disclosed above. For example, the air flow system can include the addition of a heating element within the housing as shown in the figure. And like above, in one embodiment, adjacent an underside of the heating element 332 includes at least one channel 334, the channel 334 configured to receive water from a water delivery apparatus 336. In operation, water from the apparatus 336 can be delivered to the heating element 332 which can be flashed to produce steam for the housing 350. In some embodiments, the channel 334 can also receive excess water not instantaneously converted to steam by the heating element 332. In other words, the channel 334 can help to maintain the cleanliness of the housing 350 by ensuring that water not flash steamed does not buildup at the bottom of the housing 350. In addition, the removable channel 334 may also minimize, reduce or in some instances, eliminate scaling issues.

In one embodiment, the substantially circular air flow pathway helps to facilitate circulation of at least one of heat and steam within the housing 350. And like above, steam can be introduced into the housing 350 of the air flow system without the use of a boiler or steam generator.

FIGS. 23-25 are tabulated results of the improvements in cooking time and moisture with the convection oven with steam infusion according to one embodiment of the present disclosure. The results in FIG. 23 are indicative of a cooking system according to one embodiment of the present disclosure with the addition of steam to provide enhanced faster cooking times. For example, the currently disclosed cooking system is able to cook frozen lasagna in about half the time (e.g., time reduction of about 49%) as compared to a traditional convection oven without the addition of steam. In other instances, the cooking system is able to cook yellow cake with an improvement of about 11 minutes (e.g., time reduction of about 35%).

In one embodiment, the substantially circular air flow pathway, in combination with the heating system and steam generation without the use of a boiler or steam generator, can reduce the cooking time of food products by at least about 10%, in comparison to a traditional convection oven without the addition of steam. In some embodiments, the improvement in cook time may be in the range of from about 20% to about 50%, or from about 10% to about 50%, or from about 30% to about 50%, or from about 25% to about 60%. In other embodiments, the improvement in cook time may be greater than about 15%, or greater than about 20%, or greater than about 25%, or greater than about 30%, or greater than about 35%, or greater than about 50%.

FIG. 24 shows the results of a cooking system, according to one embodiment of the present disclosure with steam versus the cooking system 10 without the addition of steam. As shown by the data, cooking time within the currently disclosed cooking system can be faster with the addition of steam than without. For example, frozen lasagna can take about 90 minutes to cook using the currently disclosed cooking system without the infusion of steam, in contrast to about 80 minutes with the additional introduction of steam to the cooking system for an improvement in cooking time reduction of about 11%. Similarly, pork chop can be cooked in about 20% less time (e.g., 24 minutes with steam versus 30 minutes without steam).

FIG. 25 shows the results of a cooking system according to one embodiment of the present disclosure with steam versus the cooking system without the addition of steam. As shown by the data, moisture loss within the currently disclosed cooking system can be less with the addition of steam than without. For example, frozen lasagna can suffer a weight loss of about 38 grams using the currently disclosed cooking system without the infusion of steam, in contrast to a weight loss of about 7 grams if cooked with the additional introduction of steam to the cooking system for an improvement in weight loss reduction of about 81%. Similarly, fish can be cooked with about 26% less weight loss (e.g., 28 grams of weight loss with steam versus 38 grams of weight loss without steam).

In one embodiment, the substantially circular air flow pathway, in combination with the heating system and steam generation without the use of a boiler or steam generator, can enhance the moisture content of the food products by at least about 10%, in comparison to a traditional convection oven without the addition of steam. In some embodiments, the enhancement in moisture content may be in the range of from about 20% to about 50%, or from about 10% to about 50%, or from about 30% to about 50%, or from about 25% to about 60%. In other embodiments, the enhancement in moisture content may be greater than about 15%, or greater than about 20%, or greater than about 25%, or greater than about 30%, or greater than about 35%, or greater than about 50%.

In some instances, electronic controllers may be included with the currently disclosed cooking system for controlling the steam rate delivery (e.g., for controlling the amount of water delivered from the apparatus). In other instances electronic controllers may be utilized for controlling temperature, among other variables, to provide better uniformity and expanded functionality. For example, tighter temperature control may lead to better uniformity of the cooking products by minimizing temperature swings. In some instances, defrosting of food products can be better produced by tighter temperature control in combination with steam infusion. In other instances, the currently disclosed cooking system can be used for proofing bread or dough products, the cooking system capable of delivering a reduction in proofing time of at least about 15% for a similar dough rise at ambient temperature.

In some embodiments, the currently disclosed cooking system may also have increased capabilities including holding function (e.g., warming drawer), proofing function (e.g., low temperature control with humidity), defrost function, and the potential to toast products with the addition of toaster rack and/or pizza tray, among other functions. In other embodiments, the cooking system may defrost food products without dehydrating the same with the infusion of steam. In other words, the currently disclosed cooking system with steam infusion can accelerate the defrosting process without over-dehydrating the food products. In one example, instead of losing water defrosting (e.g., ambient air) through condensation (e.g., losing 0.5 gram of water), a piece of steak may instead gain water (e.g., gaining 2 grams of water) during defrosting (e.g., high temperature) using the currently disclosed cooking system 10.

Specific features of the invention are shown in some drawings and not in others. This is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

The invention claimed is:

1. An oven comprising:
  a cooking enclosure defined by a plurality of interior surfaces of the oven and within which a food item is received, the cooking enclosure including at least one cooking heater element;
  a steam source arranged within the cooking enclosure;
  a steam source heater operable to heat the steam source, the steam source heater being disposed within the cooking enclosure;
  a sensor responsive to the temperature of the steam source;
  a fluid reservoir exterior to the cooking enclosure;
  a conduit connected to the fluid reservoir and extending to a location in the cooking enclosure abutting or proximate to the steam source; and
  a controller, responsive to said sensor and configured to:
    energize the steam source heater independently of the cooking heater element when the temperature of the steam source is below a first predetermined temperature and the cooking heater element is controlled to provide heat for an oven temperature below the first predetermined temperature, and
    de-energize the steam source heater independent of the cooking heater element when the temperature of the steam source is above the first predetermined temperature and the cooking heater element is controlled to provide heat for an oven temperature at or above the first predetermined temperature.

2. The oven of claim 1, further comprising a fluid flow controlling device configured to control the fluid flow from the fluid reservoir to the steam source to produce steam at a predetermined rate.

3. The oven of claim 2, wherein the fluid flow control device comprises one or more valves.

4. The oven of claim 2, wherein the fluid flow control device comprises a pump.

5. The oven of claim 2, wherein the controller is further configured to control the fluid flow control device.

6. The oven of claim 5, wherein the controller is configured to control the fluid flow control device to produce steam at a rate of between 6-7 grams per minute.

7. The oven of claim 1, wherein the steam source comprises a small trough.

8. The oven of claim 7, wherein the steam source heater is adjacent to or within the small trough.

9. The oven of claim 7, wherein the conduit terminates above the small trough.

10. The oven of claim 7, wherein the small trough is positioned proximate to a bottom corner of the cooking enclosure.

11. The oven of claim 1, wherein the fluid reservoir is removably coupled to an exterior portion of the cooking enclosure.

12. The oven of claim 1, wherein the controller is further configured to output a signal if the temperature of the steam source is greater than a second predetermined temperature.

13. The oven of claim 1, further comprising a cover over the steam source.

14. The oven of claim 1, wherein the controller is further configured, when the temperature of the steam source is above a second predetermined temperature, to energize the steam source heater, to control the fluid control means, to measure the temperature of the steam source, and to deenergize the steam source heater if the measured temperature does not fall below the second predetermined temperature.

15. A control method for steam infusion in an oven, the method comprising:
  controlling an oven heating element located within a cooking enclosure of the oven, the cooking enclosure being defined by a plurality of interior surfaces to receive a food item;
  sensing the temperature of a steam source within the cooking enclosure;
  supplying fluid from a fluid reservoir to the steam source in a steam infusion mode;
  energizing a steam source heater independent of controlling the oven heating element when the temperature of the steam source is below a first predetermined temperature and the cooking heater element is controlled to provide heat for an oven temperature below the first predetermined temperature; and
  de-energizing the steam source heater independent of controlling the oven heating element when the temperature of the steam source is above the first predetermined temperature and the cooking heater element is controlled to provide heat for an oven temperature at or above the first predetermined temperature.

16. The method of claim 15, further comprising providing a signal if the temperature of the steam source is above a second predetermined temperature.

17. The method of claim 15, further comprising controlling the fluid supplied to the steam source.

18. The method of claim 15, further comprising controlling the fluid supplied to the steam source to produce steam at a rate of between approximately 6-7 grams per minute.

19. The method of claim 15, further comprising, when the temperature of the steam source is above a second predetermined temps, supplying fluid to the steam source, energizing the steam source heater, sensing the temperature of the steam source, and deenergizing the steam source heater if the measured temperature does not fall below the second predetermined threshold.

20. An oven comprising:
  a cooking enclosure defined by a plurality of interior surfaces of the oven and within which a food item is received, the cooking enclosure including at least one cooking heater element;
  a steam source arranged within the cooking enclosure;
  a steam source heater operable to heat the steam source, the steam source heater being disposed within the cooking enclosure;
  a sensor responsive to the temperature of the steam source;
  a fluid reservoir exterior to the cooking enclosure;
  a conduit connected to the fluid reservoir and extending to a location in the cooking enclosure abutting or proximate to the steam source; and
  a controller, responsive to said sensor and configured to:
    energize the steam source heater independently of the cooking heater element when the temperature of the steam source is below a first predetermined temperature and the cooking heater element is controlled to provide heat for an oven temperature below the first predetermined temperature;
    de-energize the steam source heater independent of the cooking heater element when the temperature of the steam source is above the first predetermined temperature and the cooking heater element is controlled to provide heat for an oven temperature at or above the first predetermined temperature; and when the temperature of the steam source is above a second predetermined temperature, output a signal, energize the steam source heater, control the fluid control means, measure the temperature of the steam source, and deenergize the steam source heater if the measured temperature does not fall below the second predetermined temperature.

* * * * *